US011877217B2

(12) United States Patent
Avedisov et al.

(10) Patent No.: US 11,877,217 B2
(45) Date of Patent: Jan. 16, 2024

(54) MESSAGE PROCESSING FOR WIRELESS MESSAGES BASED ON VALUE OF INFORMATION

(71) Applicant: Toyota Motor Engineering & Manufacturing North America, Inc., Plano, TX (US)

(72) Inventors: Sergei Avedisov, Mountain View, CA (US); Takamasa Higuchi, Mountain View, CA (US); Onur Altintas, Mountain View, CA (US); Takayuki Shimizu, Mountain View, CA (US)

(*) Notice: Subject to any disclaimer, the term of this patent is extended or adjusted under 35 U.S.C. 154(b) by 335 days.

(21) Appl. No.: 17/164,739

(22) Filed: Feb. 1, 2021

(65) Prior Publication Data

US 2022/0248196 A1   Aug. 4, 2022

(51) Int. Cl.
*H04W 4/46* (2018.01)
*B60W 40/02* (2006.01)
*G06V 20/56* (2022.01)

(52) U.S. Cl.
CPC .............. *H04W 4/46* (2018.02); *B60W 40/02* (2013.01); *G06V 20/56* (2022.01);
(Continued)

(58) Field of Classification Search
CPC ......... B60W 2420/42; B60W 2552/00; B60W 2554/20; B60W 2554/80; B60W 2556/65;
(Continued)

(56) References Cited

U.S. PATENT DOCUMENTS 8,169,338 B2 * 5/2012 Mudalige ............... G08G 1/163
340/901
8,526,606 B2   9/2013 Muthaiah
(Continued)

FOREIGN PATENT DOCUMENTS

CN   107959943   4/2018
CN   108668258   10/2018
(Continued)

OTHER PUBLICATIONS

Shen, W. et al., "Cooperative message authentication in vehicular cyber-physical systems," IEEE Transactions in emerging topics in computing, vol. 1 (1), 2013, 14 pages.
(Continued)

*Primary Examiner* — Babar Sarwar
(74) *Attorney, Agent, or Firm* — Burbage Law, P.C.; Jon-Michael Burbage

(57) ABSTRACT

The disclosure includes embodiments for processing a set of wireless messages by an ego vehicle. A method includes determining a location of an object of interest in a roadway environment that includes the ego vehicle and a set of remote connected vehicles. The method includes segmenting the roadway environment into a plurality of segments. The method includes assigning priority scores to each of the segments based on (1) whether the forward-facing sensors of the remote connected vehicles present in the segment are capable of measuring the object of interest and (2) proximity of the remote connected vehicles in the segment to the object of interest, wherein segments have higher priority scores if the remote connected vehicles present in the segment have forward-facing sensors that are capable of measuring the object of interest and the remote connected vehicles present in the segment are closer to the object of interest.

20 Claims, 9 Drawing Sheets

(52) U.S. Cl.
CPC ..... *B60W 2420/42* (2013.01); *B60W 2552/00* (2020.02); *B60W 2554/20* (2020.02); *B60W 2554/80* (2020.02); *B60W 2556/05* (2020.02)

(58) Field of Classification Search
CPC ....... B60W 40/02; G06V 10/25; G06V 20/56; H04W 4/46
See application file for complete search history.

(56) References Cited

U.S. PATENT DOCUMENTS

| | | | |
|---|---|---|---|
| 8,742,987 B2 | 6/2014 | Bai et al. | |
| 10,360,797 B2 | 7/2019 | Baghel et al. | |
| 10,659,936 B2 | 5/2020 | Cheng et al. | |
| 10,760,926 B2* | 9/2020 | Engel | H04W 4/70 |
| 10,796,501 B2 | 10/2020 | Cheng et al. | |
| 2016/0249180 A1* | 8/2016 | Li | G08G 1/20 |
| 2017/0024621 A1* | 1/2017 | Thompson | H04W 4/46 |
| 2018/0026792 A1 | 1/2018 | Ben Hamida et al. | |
| 2018/0136008 A1* | 5/2018 | Engel | G01C 25/00 |
| 2018/0188037 A1* | 7/2018 | Wheeler | G06F 18/22 |
| 2018/0234889 A1* | 8/2018 | Baghel | H04W 72/30 |
| 2019/0073545 A1* | 3/2019 | Dolgov | B60Q 9/00 |
| 2019/0375403 A1* | 12/2019 | Hu | B60W 30/165 |
| 2020/0086864 A1* | 3/2020 | Rajendra Zanpure | G06T 7/70 |
| 2020/0204952 A1 | 6/2020 | Sorrentino | |
| 2020/0219386 A1* | 7/2020 | El Assaad | G06N 20/00 |
| 2020/0290631 A1* | 9/2020 | Higuchi | G05D 1/0285 |
| 2020/0334554 A1* | 10/2020 | Takahashi | G06F 11/3065 |
| 2021/0160323 A1* | 5/2021 | Nassor | H04W 4/24 |
| 2022/0111867 A1* | 4/2022 | Trask | G08G 1/166 |
| 2022/0137641 A1* | 5/2022 | Stenneth | G05D 1/0291 701/23 |
| 2022/0219718 A1* | 7/2022 | Staehlin | G08G 1/096783 |
| 2022/0397402 A1* | 12/2022 | Bolless | B60W 40/06 |

FOREIGN PATENT DOCUMENTS

| | | | |
|---|---|---|---|
| CN | 109756336 | 5/2019 | |
| EP | 3121762 A1 * | 1/2017 | ............ B60W 10/18 |
| WO | 2020074057 | 4/2020 | |

OTHER PUBLICATIONS

Krishnan, Hariharan et al., ""Verify-on-Demand"—A Practical and Scalable Approach for Broadcast Authentication in Vehicle-to-Vehicle Communication," SAE International Journal of Passenger Cars-Mechanical Systems 4.2011-01-0584, 2011, pp. 536-546.

Jaeger, Attila et al., "A novel framework for efficient mobility data verification in vehicular ad-hoc networks," International Journal of Intelligent Transportation Systems Research 10.1, 2012, pp. 11-21.

SAE J2945/1 On-Board System Requirements for V2V Safety Communications, SAE, Mar. 30, 2016, 127 pages.

* cited by examiner

```
┌─────────────────────────────────────────────────────────────────────────┐
│ Determine, by a processor of an ego vehicle, a location of an object of │ 300
│ interest in a roadway environment that includes the ego vehicle and a   │
│ set of remote connected vehicles, wherein the remote connected vehicles │
│ included in the set are equipped with forward-facing sensors.           │
│                              305                                         │
└─────────────────────────────────────────────────────────────────────────┘
                                    ↓
┌─────────────────────────────────────────────────────────────────────────┐
│        Segment the roadway environment into a plurality of segments     │
│                              310                                         │
└─────────────────────────────────────────────────────────────────────────┘
                                    ↓
┌─────────────────────────────────────────────────────────────────────────┐
│ Assign, by a processor of the ego vehicle, priority scores to each of   │
│ the segments based on (1) whether the forward-facing sensors of the     │
│ remote connected vehicles present in the segment are capable of         │
│ measuring the object of interest and (2) proximity of the remote        │
│ connected vehicles in the segment to the object of interest, wherein    │
│ segments have higher priority scores if the remote connected vehicles   │
│ present in the segment have forward-facing sensors that are capable of  │
│ measuring the object of interest and the remote connected vehicles      │
│ present in the segment are closer to the object of interest             │
│                              315                                         │
└─────────────────────────────────────────────────────────────────────────┘
                                    ↓
┌─────────────────────────────────────────────────────────────────────────┐
│ Receive, by a communication unit of the ego vehicle, a set of wireless  │
│ messages from the set of remote connected vehicles                      │
│                              320                                         │
└─────────────────────────────────────────────────────────────────────────┘
                                    ↓
┌─────────────────────────────────────────────────────────────────────────┐
│ Assign classification data to each remote connected vehicle included in │
│ the set of remote connected vehicles by executing a classification      │
│ process that includes determining which particular remote connected     │
│ vehicle transmitted each wireless message, determining which segments   │
│ of the plurality of segments are within sensory range of the            │
│ forward-facing sensors of the particular remote connected vehicle, and  │
│ outputting classification data to assign to each remote connected       │
│ vehicle based on which of the plurality of segments are within the      │
│ sensory range of the remote connected vehicle and their corresponding   │
│ priority scores                                                          │
│                              325                                         │
└─────────────────────────────────────────────────────────────────────────┘
                                    ↓
┌─────────────────────────────────────────────────────────────────────────┐
│ Rank the set of wireless messages (or the set of V2X data included in   │
│ the set of wireless messages, or the set of remote sensor data included │
│ in the set of wireless messages) in a queue based on the classification │
│ data assigned to each transmitter of each of the wireless messages      │
│                              330                                         │
└─────────────────────────────────────────────────────────────────────────┘
                                    ↓
```

MESSAGE PROCESSING FOR WIRELESS MESSAGES BASED ON VALUE OF INFORMATION

BACKGROUND

The specification relates to message processing for wireless messages based on the value of the information included in the payloads of the wireless messages.

Modern vehicles broadcast V2X messages that include digital data describing their locations, speeds, headings, past actions, and future actions, etc. Vehicles that broadcast V2X messages are referred to as "V2X transmitters." Vehicles that receive the V2X messages are referred to as "V2X receivers." The digital data that is included in the V2X messages can be used for various purposes including, for example, the proper operation of Advanced Driver Assistance Systems (ADAS systems) or autonomous driving systems which are included in the V2X receivers. However, in some scenarios the V2X messages may be spoofed or otherwise used in cyber-attacks against the V2X receivers by malicious parties. Also, some parties may have sensors that are malfunctioning or otherwise in need of maintenance.

Modern vehicles include ADAS systems or automated driving systems. An automated driving system is a collection of ADAS systems which provides sufficient driver assistance that a vehicle is autonomous. ADAS systems and automated driving systems are referred to as "vehicle control systems."

A particular vehicle that includes these vehicle control systems is referred to herein as an "ego vehicle" and other vehicles in the vicinity of the ego vehicle are referred to as "remote vehicles," "remote connected vehicles," or "remote unconnected vehicles."

SUMMARY

One type of V2X message is a Vehicle-to-Vehicle (V2V) message. Multiple classes of wireless V2V messages are being standardized in the United States and Europe. Some of the V2V messages allow for a higher level of cooperation (and conflict avoidance) between vehicles. Examples of such standardized V2V messages include cellular-V2X (C-V2X) messages. Some of these V2X messages include rich data sets describing the roadway environment, and therefore allow for a higher level of situational awareness about the roadway environment. A V2X message that includes a rich data set is described in some embodiments as a sensor sharing message (SSM). In some embodiments, SSMs are transmitted via C-V2X.

These V2X messages offer benefits in cooperation and awareness for road users. A problem is that these V2X messages may include digital data describing unreliable sensor measurements. For example, the transmitter of a V2X message may be operated by a malicious party that is intentionally transmitting V2X messages having digital data (e.g., sensor data) describing sensor measurements that falsely describe a roadway environment for the purpose of misleading recipients of the V2X message. Transmitters of V2X messages containing digital inaccurate sensor data may also not be operated by malicious parties; instead, they may be vehicles that need their sensors repaired or replaced. Accordingly, a first problem is that these V2X messages need to be computational processed to determine the validity of their sensor data is determined by the ego vehicle prior to being relied on for inputs to the ADAS systems or autonomous driving system of the ego vehicle.

A second problem is that it is not practical to verify the accuracy of the sensor data payload of every V2X message that is received by the ego vehicle since doing so would create unacceptable latency in the operation of the ADAS systems or autonomous driving system of the ego vehicle. The value of the sensor data outputted by a vehicle is variable based on many factors. Accordingly, what is needed is a way to assign priority to different transmitters of V2X messages so that the V2X messages of those vehicles that are generating potentially more valuable sensor data, relative to other vehicles, are processed earlier in time while the V2X messages of those vehicles whose sensor data does not satisfy a threshold for value are ignored. The embodiments described herein beneficially solve this second problem, among others.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for an ego vehicle to determine different priority scores to assign to wireless messages when they are transmitted by remote connected vehicles that are located in different segments of a roadway environment. The ego vehicle receives a set of the wireless messages. In some embodiments, these priority scores assist the processor of an ego vehicle to determine how to process the digital data that is included in the payloads of the set of wireless messages. The method includes determining, by the processor of the ego vehicle, a location of an object of interest in a roadway environment that includes the ego vehicle and a set of remote connected vehicles. The remote connected vehicles included in the set of remote connected vehicles are equipped with forward-facing sensors. The method includes segmenting the roadway environment into a plurality of segments. The method includes assigning, by the processor of the ego vehicle, priority scores to each of the segments based on (1) whether the forward-facing sensors of the remote connected vehicles present in the segment are capable of measuring the object of interest and (2) proximity of the remote connected vehicles in the segment to the object of interest. The segments are assigned higher priority scores if the remote connected vehicles present in the segment have forward-facing sensors that are capable of measuring the object of interest and the remote connected vehicles present in the segment are closer to the object of interest. Other embodiments of this aspect include corresponding computer systems, apparatus, and computer programs recorded on one or more computer storage devices, each configured to perform the actions of the methods.

Implementations may include one or more of the following features. The method including receiving, by a communication unit of the ego vehicle, a set of wireless messages from the set of remote connected vehicles. The method including assigning classification data to each remote connected vehicle included in the set of remote connected vehicles by executing a classification process that includes determining which particular remote connected vehicle transmitted each wireless message, determining which segments of the plurality of segments are within sensory range of the forward-facing sensors of the particular remote connected vehicle, and outputting classification data to assign to each remote connected vehicle based on which of the plurality of segments are within the sensory range of the remote connected vehicle and their corresponding priority scores. The method including ranking the set of wireless messages in a queue based on the classification data assigned to each transmitter of each of the wireless messages. The method including processing the set of wireless messages based on the ranking of the queue so that higher ranked wireless messages are processed before lower ranked wireless messages. The method where the set of wireless messages include sensor data shared with the remote connected vehicle by the set remote connected vehicles. The method including determining that the set of wireless messages includes a redundant payload and excluding the redundant payload from the processing. The method where payloads of the set of wireless messages include sensor measurements and the processor of the ego vehicle is attempting to determine information about the object of interest based at least in part on the sensor measurements with minimized latency. The method where the processing includes a verification process to determine whether payloads of the set of wireless messages includes sensor measurements that satisfy a threshold for accuracy. The method where the classification data for each remote connected vehicle is a value indicator of sensor data measurements included in the wireless messages transmitted by each the remote connected vehicles. The method where the remote connected vehicles in each segment are within a same range of proximity relative to object of interest. The method where the remote connected vehicles in each segment share a similar ability to measure the object of interest using their forward-facing sensors. The method where the object of interest includes a set of remote unconnected vehicles. The method where the segmenting occurs dynamically in substantially real time based on one or more dynamic factors. The method where the one or more dynamic factors are selected from a group that includes: a speed of the ego vehicle; an acceleration of the ego vehicle; the speed of the set of remote connected vehicles; the acceleration of the set of remote connected vehicles; and the location of an object of interest in the roadway environment relative to locations of the ego vehicle and the set of remote connected vehicles. Implementations of the described techniques may include hardware, a method or process, or computer software on a computer-accessible medium.

One general aspect includes a system of an ego vehicle. The system also includes a communication unit; a non-transitory memory; and a processor communicatively coupled to the communication unit and the non-transitory memory, where the non-transitory memory stores computer readable code that is operable, when executed by the processor, to cause the processor to execute steps including: determining a location of an object of interest in a roadway environment that includes the ego vehicle and a set of remote connected vehicles, where the remote connected vehicles included in the set are equipped with forward-facing sensors; segmenting the roadway environment into a plurality of segments; and assigning, by a processor of the ego vehicle, priority scores to each of the segments based on (1) whether the forward-facing sensors of the remote connected vehicles present in the segment are capable of measuring the object of interest and (2) proximity of the remote connected vehicles in the segment to the object of interest, where segments have higher priority scores if the remote connected vehicles present in the segment have forward-facing sensors that are capable of measuring the object of interest and the remote connected vehicles present in the segment are closer to the object of interest. Other embodiments of this aspect include corresponding computer systems, apparatus, and computer programs recorded on one or more computer storage devices, each configured to perform the actions of the methods.

Implementations may include one or more of the following features. The system where the non-transitory memory stores additional computer code that is operable, when executed by the processor, to cause the processor to execute additional steps including: receiving a set of wireless messages from the set of remote connected vehicles; assigning classification data to each remote connected vehicle included in the set of remote connected vehicles by executing a classification process that includes determining which particular remote connected vehicle transmitted each wireless message, determining which segments of the plurality of segments are within sensory range of the forward-facing sensors of the particular remote connected vehicle, and outputting classification data to assign to each remote connected vehicle based on which of the plurality of segments are within the sensory range of the remote connected vehicle and their corresponding priority scores; ranking the set of wireless messages in a queue based on the classification data assigned to each transmitter of each of the wireless messages; and processing the set of wireless messages based on the ranking of the queue so that higher ranked wireless messages are processed before lower ranked wireless messages. The system where the remote connected vehicles in each segment are within a same range of proximity relative to the object of interest. The system where the remote connected vehicles in each segment share a similar ability to measure the object of interest using their forward-facing sensors. Implementations of the described techniques may include hardware, a method or process, or computer software on a computer-accessible medium.

One general aspect includes a computer program product of an ego vehicle including computer code stored on a non-transitory memory that is operable, when executed by an onboard vehicle computer of the ego vehicle, to cause the onboard vehicle to execute operations including: determine a location of an object of interest in a roadway environment that includes the ego vehicle and a set of remote connected vehicles, where the remote connected vehicles included in the set are equipped with forward-facing sensors; segment the roadway environment into a plurality of segments; and assign priority scores to each of the segments based on (1) whether the forward-facing sensors of the remote connected vehicles present in the segment are capable of measuring the object of interest and (2) proximity of the remote connected vehicles in the segment to the object of interest, where segments have higher priority scores if the remote connected vehicles present in the segment have forward-facing sensors that are capable of measuring the object of interest and the remote connected vehicles present in the segment are closer to the object of interest. Other embodiments of this aspect include corresponding computer systems, apparatus, and computer programs recorded on one or more computer storage devices, each configured to perform the actions of the methods.

Implementations may include one or more of the following features. The computer program product where the non-transitory memory stores additional computer code that is operable, when executed by the onboard vehicle computer, to cause the onboard vehicle computer to execute additional operations including: receive a set of wireless messages from the set of remote connected vehicles; assign classification data to each remote connected vehicle included in the set of remote connected vehicles by executing a classification process that includes determining which particular remote connected vehicle transmitted each wireless message, determining which segments of the plurality of segments are within sensory range of the forward-facing sensors of the particular remote connected vehicle, and outputting classification data to assign to each remote connected vehicle based on which of the plurality of segments are within the sensory range of the remote connected vehicle and their corresponding priority scores; rank the set of wireless messages in a queue based on the classification data assigned to each transmitter of each of the wireless messages; and process the set of wireless messages based on the ranking of the queue so that higher ranked wireless messages are processed before lower ranked wireless messages. The computer program product where the remote connected vehicles in each segment are within a same range of proximity relative to the object of interest. The computer program product where the remote connected vehicles in each segment share a similar ability to measure the object of interest using their forward-facing sensors. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

FIGS. 3A and 3B are a flowchart of an example method for processing a set of wireless messages based on value of information according to some embodiments.

DETAILED DESCRIPTION

Described herein are embodiments of a processing system. The functionality of the processing system is now introduced according to some embodiments. Vehicles include onboard sensors that constantly record sensor data describing their external environment. Vehicles transmit V2X messages to one another. The sensor data includes digital data describing the sensor measurements recorded by the onboard sensors (e.g., the sensor set). These V2X messages include V2X data in their payload. The V2X data includes the sensor data they record. Vehicles that receive these V2X messages use this V2X data to improve their awareness of their environment. For vehicles that include Advanced Driver Assistance Systems (ADAS systems) or autonomous driving systems, the V2X data is inputted to these systems so that they can better understand their driving environment when providing their functionality.

Figure 1:
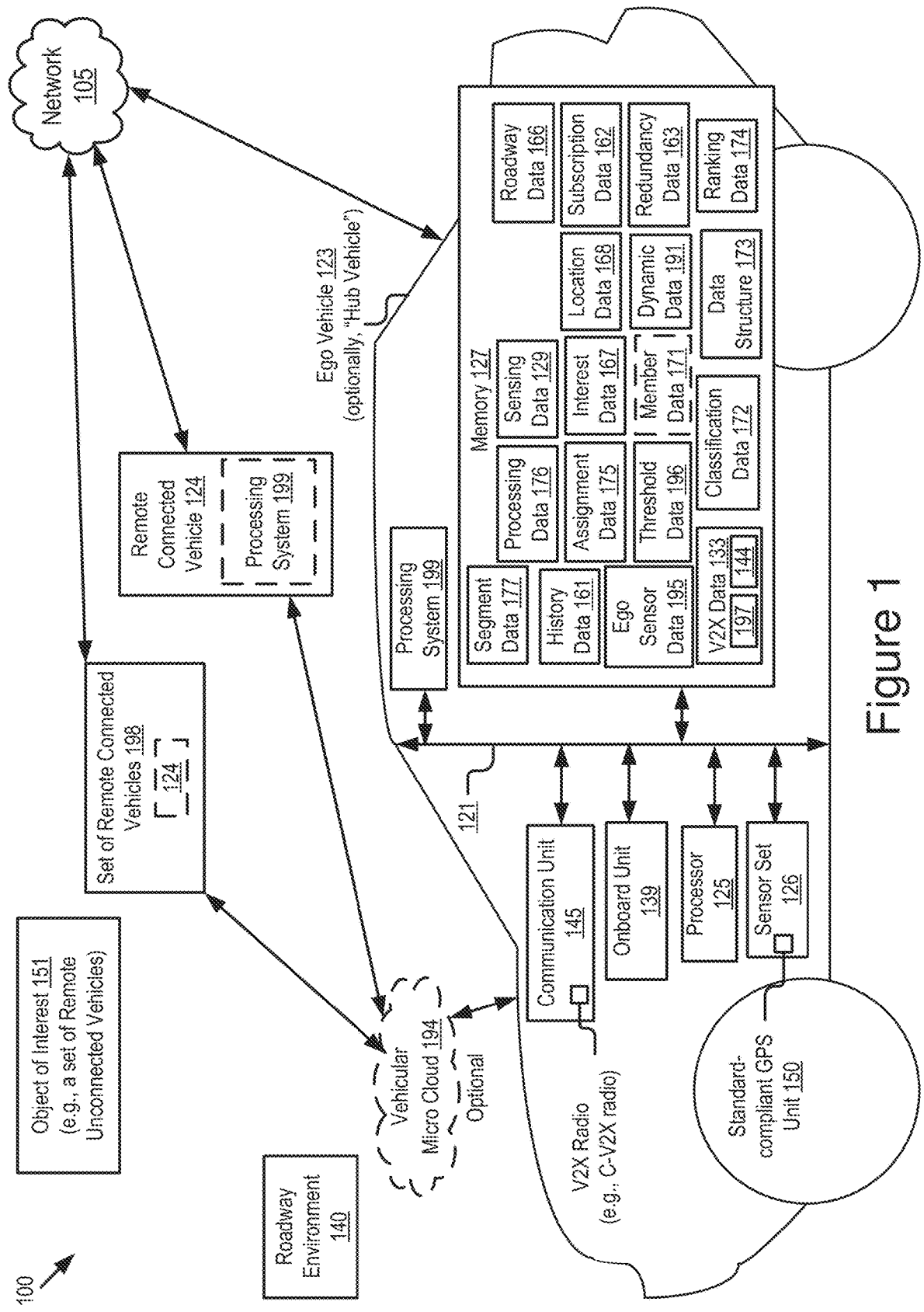
FIG. 1 is a block diagram illustrating an operating environment for a processing system according to some embodiments.

An example of the V2X data according to some embodiments includes the V2X data 133 depicted in FIG. 1. An example of the sensor data according to some embodiments includes the remote sensor data 197 depicted in FIG. 1.

A vehicle control system is an onboard system of a vehicle that controls the operation of a functionality of the vehicle. ADAS systems and autonomous driving systems are examples of vehicle control systems. Examples of the vehicle control system according to some embodiments includes the vehicle control system 153 depicted in FIG. 2.

In some embodiments, the sensor data (e.g., the remote sensor data) is analyzed by a processor of an ego vehicle to determine if it satisfies a threshold for accuracy. This step is sometimes referred to as "authenticating the V2X message" which included in the sensor data in its payload or "a verification process" for the V2X message. The verification process for V2X messages is described in more detail below. The threshold for accuracy is described by threshold data. An example of the threshold data according to some embodiments includes the threshold data 196 depicted in FIG. 1. If the threshold for accuracy is satisfied, then the sensor data is used as an input to the vehicle control system so that some or all of the driving functionality of the ego vehicle is controlled by the vehicle control system based at least in part on the sensor data received from other vehicles.

Verification Process for V2X Messages

Verifying the digital data included in V2X messages is beneficial for vehicular ad hoc networks because the process mitigates security threats and malicious attacks. Authenticating wireless messages also mitigates risks causes by non-malicious vehicles than are unknowingly broadcasting erroneous sensor data due to their onboard sensors needing maintenance.

A first problem is that these V2X messages need to be computational processed to determine the validity of their sensor data is determined by the ego vehicle prior to being relied on for inputs to the ADAS systems or autonomous driving system of the ego vehicle.

A second problem is that it is not practical to verify the accuracy of the sensor data payload of every V2X message that is received by the ego vehicle since doing so would create unacceptable latency in the operation of the ADAS systems or autonomous driving system of the ego vehicle. The verification process requires high computational overhead to connected road users and delay the utilization of received information, which creates the latency. For example, in congested scenarios it might not be possible to verify all V2X messages that are received within a given period of time even by state-of-the-art techniques are utilized. It is therefore beneficial to prioritize the verification of messages according to the criticality/value that their payload would bring to the receiver (e.g., the ego vehicle).

The value of the sensor data outputted by a vehicle is variable based on many factors. Accordingly, what is needed is a way to assign priority to different transmitters of V2X messages so that the V2X messages of those vehicles that are generating potentially more valuable sensor data, relative to other vehicles, are processed earlier in time while the V2X messages of those vehicles whose sensor data does not satisfy a threshold for value are ignored. The embodiments described herein beneficially solve this second problem, among others, by providing a processing system that is operable to assign priority to different transmitters of V2X messages so that the V2X messages of those vehicles that are generating potentially more valuable sensor data, relative to other vehicles, are processed earlier in time while the V2X messages of those vehicles whose sensor data does not satisfy a threshold for value are ignored or processed later.

Two-Step Queue Process

In some embodiments, the processing system provides a two-step queue process to prioritize V2X messages. In some embodiments, the two-step queue process provided by the processing system of an ego vehicle provides its functionality based on locality sensitive hashing (see, e.g., the description for FIG. 4) or a different way of determining the value of the sensor data generated by a remote connected vehicle (e.g., remote sensor data) based on the location of the remote connected vehicle relative to an object of interest which is measured by the onboard sensors of the remote connected vehicle. In some embodiments, this two-step process only considers the forward-facing sensors of the remote connected vehicle when executing the two-step queue process. See, e.g., in FIG. 4 how only the forward-sensing range of remote connected vehicles R1, R2, R3, R4 are considered; this is described in more detail below.

In some embodiments, the first step of the two-step queue process includes a processor of the ego vehicle arranging V2X messages based on the geographic location of the sensing area measured by the onboard sensors of the remote connected vehicles relative to the geographic location of the ego vehicle and an object of interest. In some embodiments, the second step of the two-step queue process includes arranging V2X messages based on the detected vehicles/objects.

Figure 7:
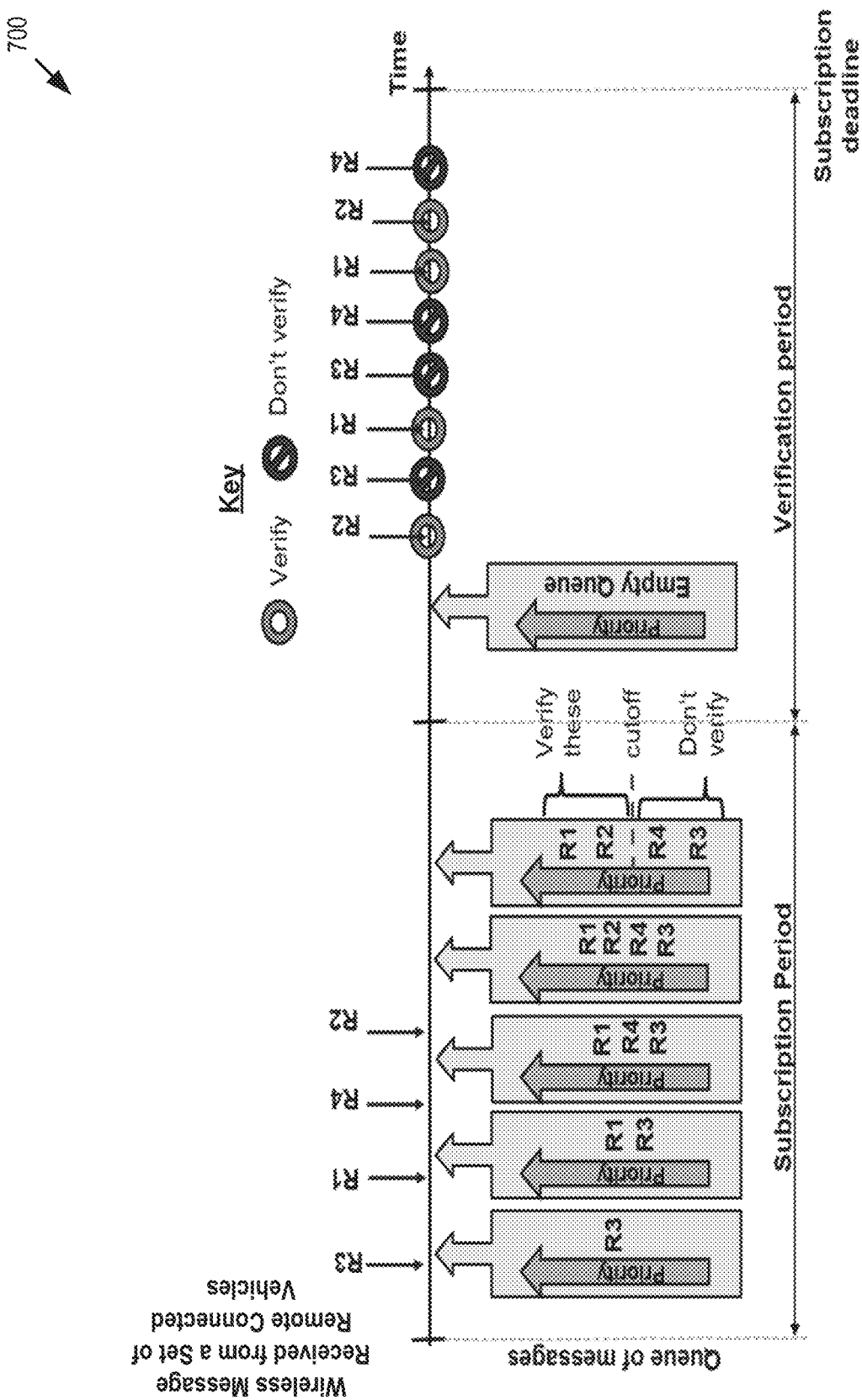
FIG. 7 is a block diagram of an example use case of ranking wireless messages in a queue using a subscription period according to some embodiments.
Figure 8:
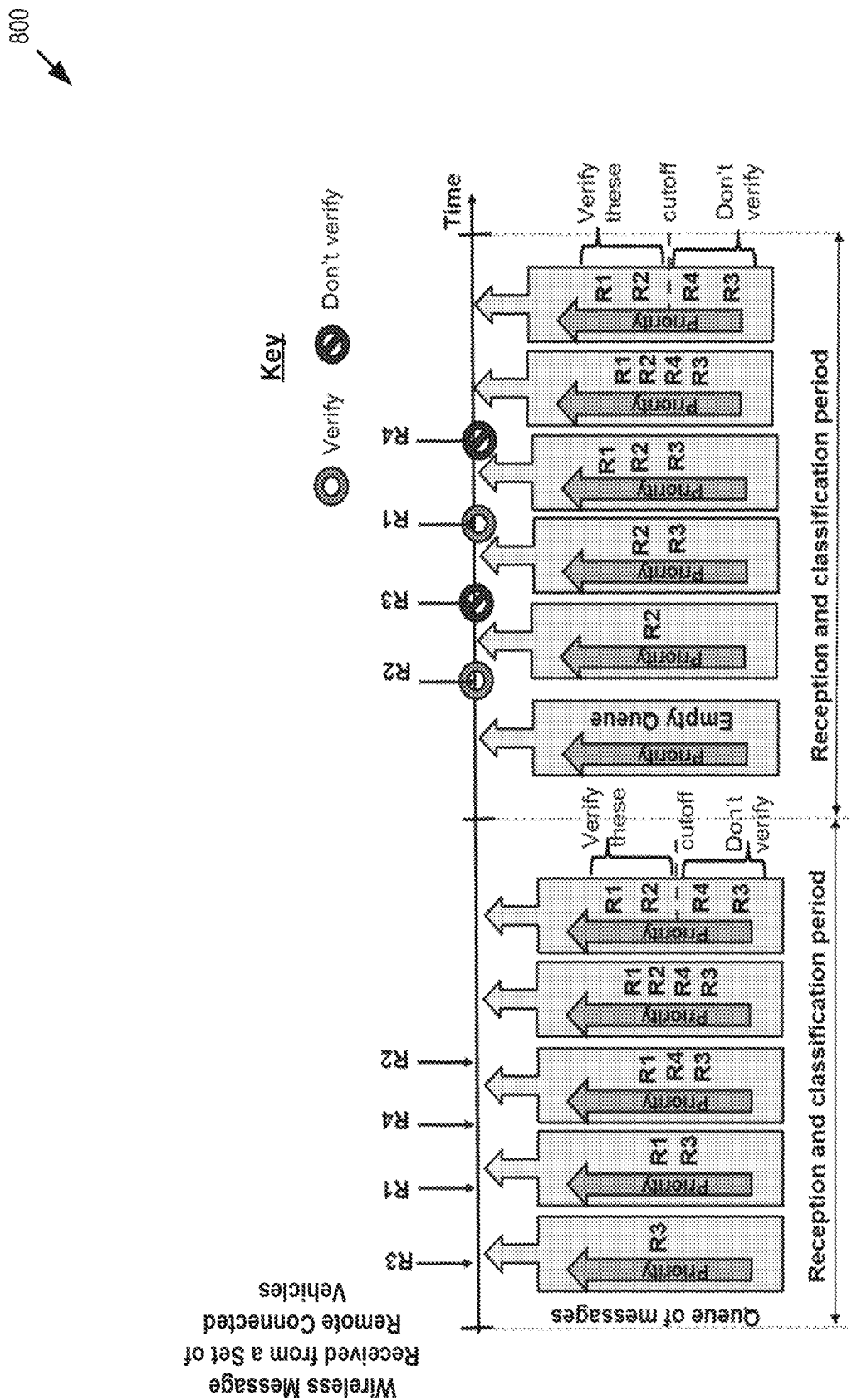
FIG. 8 is a block diagram of an example use case of ranking wireless messages in a queue using history data according to some embodiments.

In some embodiments, the two-step process includes one or more verification process including: a direct verification procedure (see, e.g., FIG. 6); a prediction-based verification procedure based on history data (see, e.g., FIG. 7); and a subscription-based verification procedure (see, e.g., FIG. 8). In some embodiments, the verification process is dynamically selected on-the-fly by the processing system based on one or more of the following: environment conditions (e.g., weather); traffic conditions (e.g., traffic congestion, speed, velocity, traffic accidents, penetration of connected vehicles, etc.); and channel load (e.g., channel load of a V2X channel used for transmitting the V2X messages described herein).

The ego vehicle includes a communication unit and the processing system. The communication unit includes a V2X radio having various V2X channels for receiving V2X messages such as those transmitted by remote connected vehicles.

An example of the communication unit according to some embodiments includes the communication unit 145 depicted in FIG. 1. vehicles. An example of the ego vehicle according to some embodiments includes the ego vehicle 123 depicted in FIG. 1. vehicles. An example of the remote connected vehicle according to some embodiments includes the remote connected vehicle 124 depicted in FIG. 1.

In some embodiments, the communication unit of the ego vehicle receives a V2X message from a remote connected vehicle. The processing system of the ego vehicle parses V2X data from the V2X message. The V2X data is digital data that is the payload of the V2X message. An example of the V2X data according to some embodiments includes the V2X data 133 depicted in FIG. 1. The V2X data includes remote sensor data. The remote sensor data includes digital data that describes the sensor measurements recorded by the onboard sensors of the remote connected vehicle. An example of the remote sensor data according to some embodiments includes the remote sensor data 197 depicted in FIG. 1.

The processing system stores the V2X data in a memory of the ego vehicle. The memory is a non-transitory storage medium. An example of the memory according to some embodiments includes the memory 127 depicted in FIG. 1. In some embodiments, the memory includes a buffer. The processing system stores the V2X data in the memory. For example, the processing system stores the V2X data in the buffer. The memory (e.g., the buffer) includes a queue or some other data structure the V2X data received from remote connected vehicles. The processing system analyzes qualities of the V2X data, and/or the transmitter of the V2X message which includes the V2X data, to determine a value of the information described by the V2X data relative to other instances of V2X data which are received by the ego vehicle. For example, the processing system determines the value of the sensor data measurements described by the various instances of remote sensor data included in various instances of V2X data which are received from a plurality of remote connected vehicles. The processing system orders the instances of digital data in the queue based on the determination of their values relative to one another with higher value digital data instances being ranked higher than lower value digital data instances. Examples of this ranking is depicted and described herein with reference to FIGS. 5-8.

In some embodiments, instances of V2X data (or remote sensor data) having a higher ranking in FIGS. 5-8 also have a higher priority to the processing system, and as such are more likely to be verified by the processing system. Lower ranked instances of V2X data (or remote senor data) are not verified. According, latency is reduced by the processing system assigning rankings to the payload of V2X messages and not verifying those payloads which are not ranked higher relative to the other received payloads.

Data structure data includes digital data that describes the queue or some other data structure within which instances of V2X data and/or remote sensor data are ranked relative to one another. An example of the data structure data according to some embodiments includes the data structure data 173 depicted in FIG. 1. An example of a data structure including such rankings according to some embodiments includes the queues depicted in FIGS. 5-8.

In some embodiments, the processing system determines a first value of sensor measurements described by a first instance remote sensor data included in a first V2X message transmitted by a first remote connected vehicle relative to a second value of sensor measurements described by a second instance of remote sensor data included in a second V2X message transmitted by a second remote connected vehicle. The first instance of remote sensor data and the second instance of remote sensor data are then ranked relative to one another and ordered accordingly in the queue based on their relative rankings. Ranking data includes digital data that describing relative rankings of a plurality of instances of remote sensor data. An example of the ranking data according to some embodiments includes the ranking data 174 depicted in FIG. 1.

In some embodiments, the value of the remote sensor data included in a particular V2X message is based on the sensory range of the onboard sensors of the remote connected vehicle that recorded the remote sensor data. In some embodiments, the value of the remote sensor data is based on the sensor range of the forward-facing sensors included in the onboard sensor set of the remote connected vehicle and whether this sensor range enables it to record sensor measurements for an object of interest (e.g., a remote unconnected vehicle or some other object of interest to the vehicle control systems of the ego vehicle). In some embodiments, the ego vehicle determines the sensor range of a remote connected vehicles forward-facing sensors based on both (1) the sensitivity/quality of the forward-facing sensors and (2) the geographic location of the remote connected vehicle and which "segment" of a roadway that the remote connected vehicle is located in relative to the object of interest. This is described in more detail with reference to FIG. 4. This, among other things, is also described in steps 305-330 depicted in FIG. 3A.

An example of an object of interest according to some embodiments includes the object of interest 151 depicted in FIG. 1.

Value data includes digital data that describes variables and factors which affect the quality of the remote sensor data recorded by a particular remote connected vehicle. In some embodiments, the value data is included in the V2X data for a V2X message. In some embodiments, each V2X message includes the value data within its payload. In some embodiments some or all of the value data is inferred by the processing system of the ego vehicle. The value data beneficially enables the processing system to provide its functionality in ranking payloads. In some embodiments the value data includes one or more of the following: (1) geographic location of the remote connected vehicle; (2) sensor range of the forward-facing sensors of the remote connected vehicle; (3) sensitivity of the forward-facing sensors of the remote connected vehicle; (4) information describing whether the forward-facing sensors' view of the object of interest is obstructed; (5) information describing whether the forward-facing sensors are damaged, poorly calibrated, or otherwise in need of maintenance; (6) information describing the collective quality of the sensor measurements recorded by the forward-facing sensors of the remote connected vehicle (e.g., a fully-autonomous vehicle will generally have better quality sensor measurements than a vehicle which has a lower-level of automaticity); and (7) dynamic data describing dynamic variables about the remote connected vehicle at the time when the remote sensor data was recorded such driving speed, acceleration, weather conditions, lighting conditions, density of vehicles on the roadway, breaking instances, hard turning, or any other dynamic sensor measurement that is recordable by the onboard sensors described below with reference to the sensor set 126.

An example of the value data according to some embodiments includes the value data 144 depicted in FIG. 1.

In some embodiments, the location data 168 is an element of the value data 144. The location data 168 includes digital data that describes the geographic location of an object such as a remote connected vehicle. In some embodiments, the location data 168 is an element of the dynamic data. According, in some embodiments one or more of the location data 168 and the dynamic data 191 are elements of the value data 144.

An example of the dynamic data according to some embodiments includes the dynamic data 191 depicted in FIG. 1.

Ranking Payloads Based on History Data

History data includes digital data that describes the rankings that have been assigned to the payloads of the V2X messages transmitted by particular remote connected vehicles in the past. An example of the history data includes the history data 161 depicted in FIG. 1.

In some embodiments, the processing system utilizes history data to provide its functionality. For example, each instance of remote sensor data or V2X data received from a particular remote connected vehicle is assigned the same ranking each time an instance is received by the ego vehicle during a particular period (e.g., time frame, time range, etc.). This is because the value of the remote sensor data or V2X data is based on its geographic location on a roadway relative to an object of interest (as indicated by its segment within the roadway) and the sensor range of the forward-facing sensors which are used to record the sensor measurements which are described by the remote sensor data or V2X data, and these are relatively static within the particular period.

An example of ranking based on history data according to some embodiments is depicted in FIG. 8.

Ranking Payloads Based on Subscription Data

Subscription data includes digital data that describes a subset of the remote connected vehicles which the processing system of the ego vehicle has identified for subscription. The subset includes remote connected vehicles transmit V2X messages including V2X data which the processing system of the ego vehicle has determined to verify.

In some embodiments, the decision by the processing system to subscribe to particular remote connected vehicles, e.g., the decision to include certain remote connected vehicles in the subset while excluding others, is made based on the perceived value of the information includes in the V2X data (e.g., based on the rankings described above or some other value-based criteria).

In some embodiments, the processing system utilizes subscription data to provide its functionality. For example, during a "subscription period" the processing system aggregates V2X data from these remote connected vehicles and stores them in a queue. After the subscription period ends, the V2X data received from remote connected vehicles which the processing system of the ego vehicle has subscribed to are verified by the processing system during a period described as the "verification period." According, the subscription period is a first period of time in which V2X data from the subset of remote connected vehicles is aggregated and the verification period is a second period of time during which the processing system of the ego vehicle verifies the V2X data for this subset.

An example of verifying V2X data based on subscription data according to some embodiments is depicted in FIG. 7.

Example General Method

In some embodiments, the processing system includes code and routines that are operable, when executed by a processor, to cause the processor to execute one or more steps of an example general method. The processing system may be an element of an ego vehicle or a roadway device such as a roadside unit (RSU). As described, the processing system is an element of an ego vehicle, but this description is not intended to be limiting. An example of the example general method is now described. In some embodiments, one or more steps of the example general method are skipped. The steps of the example general method may be executed in any order, and not necessarily the order presented. The steps of the example general method are now described according to some embodiments.

In some embodiments, these steps are executed by a processor or onboard vehicle computer of an ego vehicle. The ego vehicle is a connected vehicle. A connected vehicle is a vehicles that includes a communication unit. An example of a communication unit includes the communication unit 145 depicted in FIG. 1. The remote connected vehicles described herein is also a connected vehicle having a communication unit. A remote unconnected vehicles is not a connected vehicle and does not include a communication unit.

Step 1: Receive a first V2X message from a remote connected vehicle. The first V2X message is received via a V2X channel of a communication unit. The first V2X message includes V2X data. The V2X data includes one or more of the following: remote sensor data; value data; and dynamic data. In some embodiments, some of these data types are subsets of one or more of the other data types. For example, the dynamic data is an element of one or more of the remote senso data and the value data.

The remote connected vehicle is a connected vehicle that includes an onboard sensor set.

The remote sensor data includes digital data that describes the sensor measurements of the onboard sensor set of the remote connected vehicle. The remote sensor data is included in the V2X data of the first V2X message. The V2X data includes any digital data included in the payload of the V2X data, including the remote sensor data. An example of the V2X data according to some embodiments includes the V2X data 133 depicted in FIG. 1. An example of the remote sensor data according to some embodiments includes the remote sensor data 197 depicted in FIG. 1. The remote sensor data is digital data that describes, among other things, sensor measurements that describe a roadway environment.

The roadway environment includes the remote connected vehicle, the ego vehicle, and an object of interest. The object of interest is an object in the roadway environment that is of interest to the processing system of the ego vehicle, for example, because it affects an operation of vehicle control system of the ego vehicle. An example of an object of interest includes a set of remote unconnected vehicles traveling on the roadway. See, for example, FIG. 4.

As used herein, the terms "wireless message," "first wireless message," and "second wireless message" refer to a V2X message transmitted by a communication unit of a connected vehicle such as a remote connected vehicle or the ego vehicle.

Step 2: Collect ego sensor data. The ego vehicle is a connected vehicle that includes an onboard sensor set. The ego sensor data includes digital data that describes the sensor measurements of the onboard sensor set of the ego vehicle. An example of the remote sensor data according to some embodiments includes the ego sensor data 195 depicted in FIG. 1. The ego sensor data includes sensor measurements that describe the roadway environment. In some embodiments, one or more of the ego sensor data and the remote sensor data describe aspects of the object of interest.

Step 3: Determine a location of an object of interest in a roadway environment that includes the ego vehicle and a set of remote connected vehicles. The remote connected vehicles included in the set are equipped with forward-facing sensors.

In some embodiments, the sensors of the ego vehicle and the forward-facing sensors of the remote connected vehicles include one or more of those described below with reference to the sensor set 126.

In some embodiments, the processing system of the ego vehicle determines the location of the object of interest using the sensors included in the sensor set of the ego vehicle. For example, the sensors include a range finding sensor (e.g., LIDAR) and a camera and the processing sensor uses the image data generated by the camera to identify the object of interest in the roadway and the range measurements produced by the range finding sensor to determine the location of the object of interest relative to the location of the ego vehicle itself. The sensors of the ego vehicle include a GPS sensor and so the processing system uses the location of the object of interest relative to the ego vehicle in combination with the geographic location of the ego vehicle to estimate the location of the object of interest in the roadway.

In some embodiments, the object of interest includes one or more remote unconnected vehicle. A remote unconnected vehicle includes a vehicle remote from the ego vehicle that does not include a communication unit.

Figure 4:
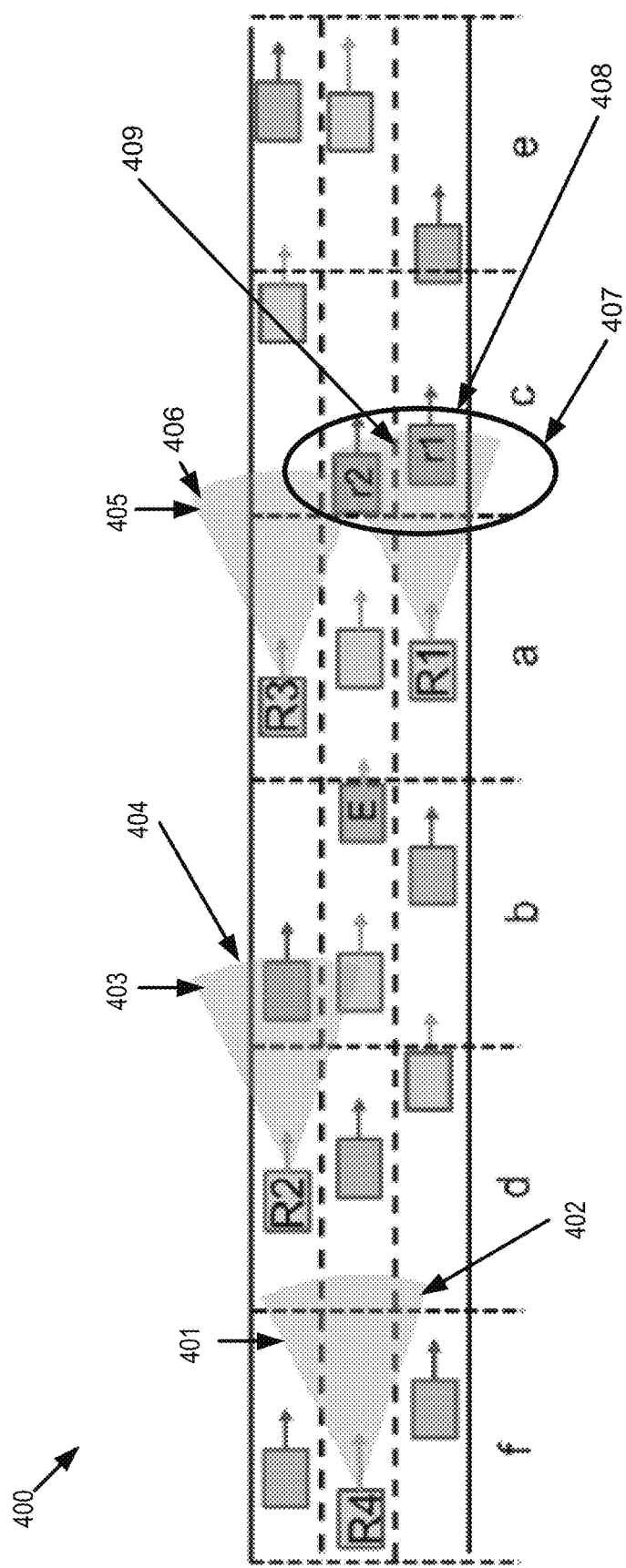
FIG. 4 is a block diagram of an example use case of the processing system according to some embodiments.

Interest data includes digital data that describes the one or more objects of interest identified at step 3 and the estimated geographic locations of these objects of interest. An example of the interest data includes the interest data 167 depicted in FIG. 1. As another example, FIG. 4 depicts two objects of interest. The interest data 167 for this example describes that the objects of interest are remote unconnected vehicles r1 and r2 as well as the estimated geographic locations of these remote unconnected vehicles r1 and r2.

Ego sensor data includes digital data that describes the sensor measurements recorded by the sensor set of the ego vehicle. An example of the ego sensor data according to some embodiments includes the ego sensor data 195 depicted in FIG. 1.

An example of identifying remote unconnected vehicles on a roadway is now described. This example is illustrative and not limiting. In some embodiments, the remote connected vehicles broadcast safety messages such as Basic Safety Messages ("BSM" if singular or "BSMs" if plural) at a regular interval (e.g., once every tenth of a second). The payload of the of BSM includes digital data that describes the geographic location of the transmitter of the BSM. Standards creation bodies require that such BSMs be transmitted by connected vehicles, and as such, each remote connected vehicle is identifiable based on their BSM transmissions. If a vehicle is present on the roadway but does not provide a BSM, then it is safe to assume that the vehicle is an unconnected vehicle. In other words, it is safe to assume that a vehicle that not transmitting a BSM is not a connected vehicle). The processing system of the ego vehicle identifies remote unconnected vehicles by: (1) parsing BSM data for GPS data included in the BSM data to determine the location of each of the remote connected vehicles on the roadway with BSM transmission range of the ego vehicle; (2) using image data and range finding data as described above to determine the geographic locations of each vehicle with is viewable by the onboard sensors of the ego vehicle; (3) identifying instances of vehicles located at geographic locations which are not described by the GPS data parsed from the BSM data; and (4) determining that the vehicles identified at step 3 are remote unconnected vehicles based on the determination that they have not transmitted a BSM. Persons having ordinary skill in the art will recognize other ways of identifying remote unconnected vehicles on a roadway by an ego vehicle.

Step 4: Segment the roadway environment into a plurality of segments. Roadway data includes digital data that describes a roadway. The roadway data is stored in a memory of the ego vehicle and is available via satellite imagery, GPS sources, digital map information, the ego sensor data, the remote sensor data, and other sources. An example of the roadway data according to some embodiments includes the roadway data 166 depicted in FIG. 1.

When considered collectively, the dynamic data from a set of remote connected vehicles describes dynamic properties of the vehicles traveling on the roadway over a period of time including the present. When analyzed by the processing system using learning algorithms included in the code and routines of the processing system in some embodiments, the dynamic data over a period of time also indicates the future behaviors of the set of remote connected vehicles. The processing system also has access to the location data that describes the location of the object on interest in the roadway and the locations of the remote connected vehicles relative to the object of interest. The processing system also has access to the value data 144 which describes, among other things, information about the forward-facing sensors of the remote connected vehicles and their ability to record sensor measurements of the object of interest, as well as the quality or reliability of these sensor measurements. Using the digital described in this paragraph, among others (e.g., the roadway data, the interest data, and any other digital data stored by the memory 127 depicted in FIG. 1), the processing system determines segment data for the roadway. In some embodiments, this determination is made dynamically by the processing system based on the analysis described herein. In some embodiments, this determination is made on the fly by the processing system. Segment data includes digital data that describes segments of the roadway and which objects (e.g., the ego vehicle, the remote connected vehicles, the object of interest) are located in which segments. An example of the segments is depicted in FIG. 4.

Figure 3B:
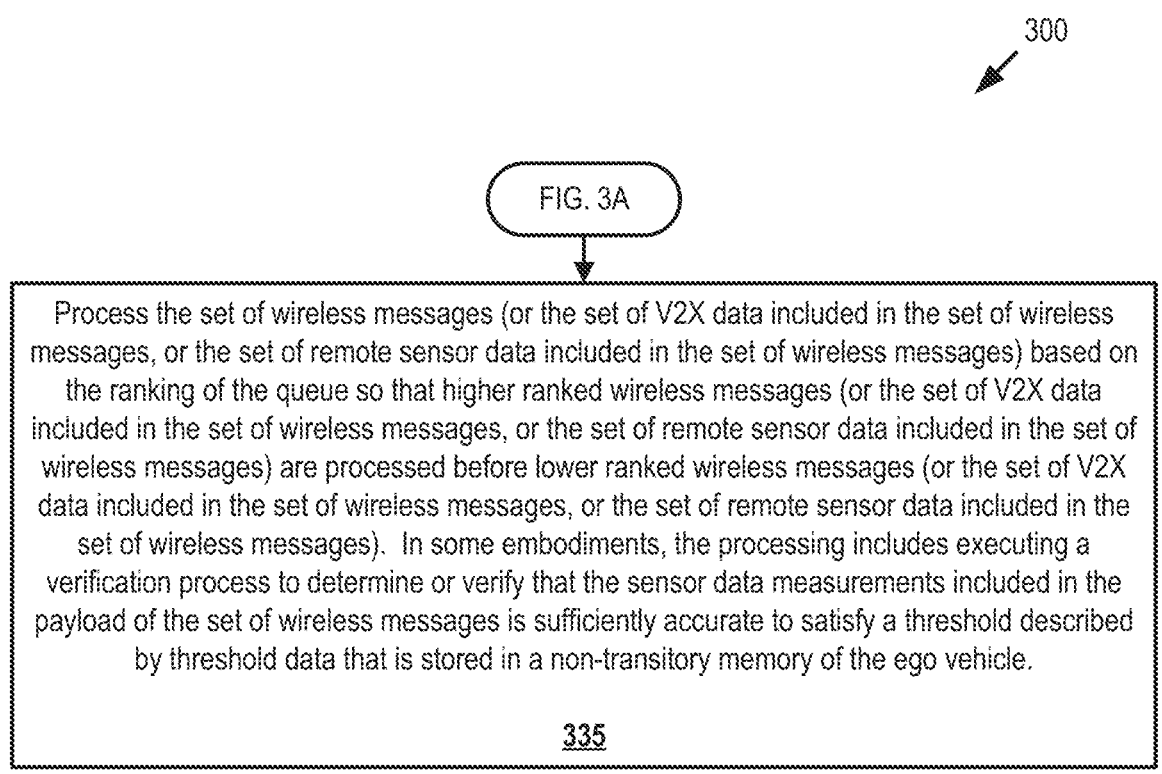

Interest data includes digital data that describes the objects of interest to the ego vehicle, as determined at step 3 of this example general method (or step 305 of method 300 depicted in FIGS. 3A and 3B). In some embodiments, the interest data describes, among other things, the geographic location and heading of the object(s) of interest. An example of the interest data includes the interest data 167 depicted in FIG. 1.

Referring to FIG. 4, the roadway is segmented into six segments designed by the letters f, d, b, a, c, and e. E is an example of a remote connected vehicle 124; R1 is an example of a remote connected vehicle 124; R2 is an example of a remote connected vehicle 124; R3 is an example of a remote connected vehicle 124; R4 is an example of a remote connected vehicle 124; r1 is a remote unconnected vehicle, which is an example of an object of interest 151; r2 is a remote unconnected vehicle, which is an example of an object of interest 151; R1, R2, R3, and R4 are an example of a set of remote connected vehicles 198; and r1, r2 are collectively or individually an example of an object of interest 151 or a set of remote unconnected vehicles. 401 represents a forward sensing area of R4, 402 represents an edge of a sensing range for R4, 403 represents a forward sensing area of R2, 404 represents an edge of a sensing range for R2, 405 represents a forward sensing range of R3, 406 represents an edge of a sensing range for R3, 407 represents objects of interest to the ego vehicle, 408 represents an edge of a sensing range for R1, and 409 represents a forward sensing range of R1. In this example the segment data describes the following: what range of the roadway is segment f; what range of the roadway is segment d; what range of the roadway is segment b; what range of the roadway is segment a; what range of the roadway is segment c; what range of the roadway is segment e; that the object of interest is located in the c segment; that remote connected vehicle R4 is located in segment f; that the remote connected vehicle R2 is located in segment d; that remote connected vehicles R3 and R1 are located in segment a; that the objects of interest r1 and r2 are located in segment c.

An example of the segment data according to some embodiments includes the segment data 177 depicted in FIG. 1.

In some embodiments, the roadway data includes digital data that describes boundaries of the roadway and the identity of the objects within the roadway are described by roadway.

Accordingly, in some embodiments, the step 4 generates sensing data. This is described in more detail below with reference to step 5 of this example general method.

Step 5: Assign priority scores to the segments. In some embodiments, the processor system assigns priority scores to each of the segments described by the segment data.

In some embodiments, the processing system assigns the priority scores to each of the segments on an individual basis based on one or more of the following: (1) whether the forward-facing sensors of the one or more remote connected vehicles present in the segment are capable of measuring the object of interest; and (2) proximities of the one or more remote connected vehicles in the segment to the object of interest, wherein segments have higher priority scores if the remote connected vehicles present in the segment have forward-facing sensors that are capable of measuring the object of interest and the remote connected vehicles present in the segment are closer to the object of interest.

In some embodiments, a higher priority score for a first segment relative to the other second segments which have a lower priority score than the first segment indicates that the remote connected vehicles within the first segment have forward-facing sensors that are able to record higher value sensor measurements of the object of interest when compared to the sensor measurements of the other second segments.

For example, with reference to the example depicted in FIG. 4 according to some embodiments, the segment a has the highest priority score of all the segments depicted in FIG. 4 because the forward sensing range of remote connected vehicles R1 and R3 include at least some of the objects of interest r1 and r2. The forward sensing range for a particular remote connected vehicle includes the portion of the roadway which the forward-facing sensors of that particular remote connected vehicle are able to measure. For example, the forward-facing sensors of remote connected vehicle R1 depicted in FIG. 4 are able to measure the shaded region of the roadway which is labeled "Forward Sensing Range of R1" in FIG. 4.

Continuing with reference to FIG. 4, the relative priority scores for each of the segments in this example are as follows: a>b>c>d>e>f.

Assignment data includes digital data that describes the priority scores assigned to each of the segments by the processing system at step 5. An example of the assignment data includes assignment data 175 depicted in FIG. 1 according to some embodiments. In some embodiments, the processing system generates the assignment data based on the analysis described herein.

An example of generating assignment data according to some embodiments is now described. In some embodiments, the processing system identifies the dimensions of the roadway based on the roadway data. The processing system then determines the location of the object of interest as described above in step 3 of this example general method. The location of the objects of interest are described by the interest data. The processing system determines the location of each of the remote connected vehicles based on the interest data. The processing system determines, for each remote connected vehicle that provides V2X data to the ego vehicle, the sensing range of its forward-facing sensors based on the value data included in the V2X data provided by that vehicle. The processing system maps the sensing range to the roadway based on the roadway data to determine the area of the roadway which is sensed by the forward-facing sensors of each remote connected vehicle. In some embodiments, the processing system generates sensing data that is digital data that describes the sensing range of each remote connected vehicle that provides V2X data to the ego vehicle. An example of the sensing data includes the sensing data 129 depicted in FIG. 1. The processing system determines, for each remote connected vehicle, whether the object of interest is within the sensing range of that remote connected vehicle. See, for example, the sensing ranges depicted in FIG. 4. The output of this determination is stored in the sensing data by the processing system. A segment is more likely to be given a higher priority by the processing system if the sensing range for the particular remote connected vehicles in the segment include the object of interest.

In some embodiments, if multiple segments include vehicles whose sensing range include the object of interest, then the segment which is closest to the object of interest will generally be ranked highest. In some embodiments, exceptions may apply if a segment includes a remote connected vehicle that is a fully autonomous vehicle and thus has sensors whose value data are superior because the high sensitivity of the sensors included in such vehicles.

In some embodiments, if the object of interest is not within the sensing range of a particular remote connected vehicle, then the processing system determines a distance from the forward-most edge of the sensing range (for this particular remote connected vehicle) to the geographic location of the object of interest; this step is repeated for each remote connected vehicle whose sensing range does not include the object of interest, and the distances are then stored in the sensing data. See, for example, FIG. 4 which depicts examples of the edge of some example sensing ranges. The forward-most edge of a vehicle's sensing range is the edge which is closest to the object of interest. These distances between the forward-most edge and the object of interest are stored by the processing system in the sensing data. In some embodiments, the processing system prioritizes the segments for the roadway for segments that include remote connected vehicles whose sensing range does not include the object of interest based one or more of the following: the distances between the forward-most edge of the sending range and the object of interest as described by the sensing data; and the value data for each remote connected vehicle included in these segments; and the dynamic data for these remote connected vehicles.

In some embodiments, the sensing data also affects step 4 and how the roadway is segmented by the processing system. Accordingly, in some embodiments, the sensing data is generated as a sub-step for step 4. For example, in some embodiments the processing system generates a single segment that includes vehicles whose sensing range includes the objects of interest. This segment has the highest priority assigned to it by the processing system. Then the processing system compares the various distances described by the sensing data (e.g., the distances that describe the distance from the forward-most edge of the sending ranges and the object of interest) and groups vehicles together in same segments if their distances are similar or within a threshold (which is described by threshold data stored in a memory of the ego vehicle). As different groups are created by the processing system, the processing system segments the roadway so that each segment has one group; this process is repeated for each group, and in this way the segments for the entire relevant portion of the roadway are created by the processing system.

Step 6: Receive, by a communication unit of the ego vehicle, a set of wireless messages from the set of remote connected vehicles. In some embodiments, the remote connected vehicles each include their own instance of the processing system.

In some embodiments, the processing systems of the set of remote connected vehicles cause the sensor set of the remote connected vehicles to generate the remote sensor data. For example, the processing systems cause the onboard sensor sets of the set of remote connected vehicles to record sensor measurements of their roadway environment and generate remote sensor data (e.g., see the remote sensor data 197 depicted in FIG. 1).

In some embodiments, the remote sensor data described here only includes the remote sensor measurements of the forward-facing sensors of the onboard sensor set, and the processing system of the remote connected vehicles takes actions to specifically exclude all sensor measurements recorded by sensors other than the forward-facing sensors of the sensor set of the remote connected vehicles. For example, the processing systems exclude camera images recorded by the back-up cameras of the remote connected vehicles since a back-up camera is a rearward-facing sensor and not a forward-facing sensor.

In some embodiments, the processing systems of the set of remote connected vehicles generates the value data for the remote sensor data generated in this step. For example, the processing system gathers all the data necessary to generate the value data 144 depicted in FIG. 1.

In some embodiments, a processing system of a remote connected vehicle builds the V2X data so that it includes the remote sensor data and the value data for this remote connected vehicle. The processing system builds a V2X message that includes the V2X data as its payload. An example of the V2X data includes the V2X data depicted in FIG. 1. The processing system builds a V2X message that includes the V2X data as its payload. The processing system transmits the V2X message. This transmission is either a unicast specifically to a particular ego vehicle or a broadcast. In some embodiments, the sub-steps of this paragraph are repeated for each vehicle included in the set of remote connected vehicles.

The communication unit of the ego vehicle receives the V2X messages from the set of remote connected vehicles. The processing system of the ego vehicle parses the V2X data from these V2X messages and stores the aggregated V2X data in the memory of the ego vehicle. For example, in some embodiments the V2X data 133 depicted in FIG. 1 includes the aggregated V2X data, remote sensor data 197 and value data 144 received from the set of remote connected vehicles by the communication unit 145 of the ego vehicle 123 over a period of time.

Step 7: Assign classification data to each remote connected vehicle included in the set of remote connected vehicles by executing a classification process. In some embodiments, the classification process includes one or more of the following: determining which particular remote connected vehicle transmitted each wireless message; determining which segments of the plurality of segments are within sensory range of the forward-facing sensors of the particular remote connected vehicle; and outputting classification data to assign to each remote connected vehicle based on which of the plurality of segments are within the sensory range of the remote connected vehicle and their corresponding priority scores.

In some embodiments, classification data includes digital data that describes, for a particular remote connected vehicle, which of the plurality of segments described by the segment data are within the sensory range of this particular remote connected vehicle. In some embodiments, the classification data describes which segment the remote connected vehicle is located within at the time that its remote sensor data was recorded by the onboard sensor set of the remote connected vehicle. In some embodiments, an instance of classification data is generated for each remote connected vehicle included in the set of remote connected vehicles.

An example of the classification data according to some embodiments includes the classification data 172 depicted in FIG. 1.

Step 8: Rank the set of wireless messages in a queue based on the classification data assigned to each transmitter of each of the wireless messages. In some embodiments, the V2X data for a particular wireless messages which were received are ranked in the queue and not the wireless messages themselves. In some embodiments, the remote sensor data included in the V2X data is ranked in the queue and not the wireless messages themselves. The description provided herein refers to ranking the wireless messages, ranking the V2X data, and ranking the remote sensor data. However, it is to be understood that in descriptions provided herein referring to the ranking of digital data or wireless messages in the queue, these terms are interchangeable since in any of these elements are capable of being ranked by the processing system in the queue.

In some embodiments, individual instances of wireless messages (or the set of V2X data included in the set of wireless messages, or the set of remote sensor data included in the set of wireless messages) are ranked in the queue by the processing system based on one or more of the following: the instance of classification data that corresponds to the particular wireless message (or the set of V2X data included in this wireless message, or the set of remote sensor data included in this wireless message); and the corresponding instance of assignment data for the segment in which the remote connected vehicle was located in at the time that the remote sensor data was recorded by this particular remote connected vehicle.

In some embodiments, the classification data for a particular remote vehicle affects the ranking assigned to the V2X data provided by this particular remote vehicle. In some embodiments, the ranking determined at step 8 is affected by one or both of (1) which of the plurality of segments described by the segment data are within the sensory range of this particular remote connected vehicle and (2) which segment the remote connected vehicle is located within at the time that its remote sensor data was recorded by the onboard sensor set of the remote connected vehicle.

Figure 5:
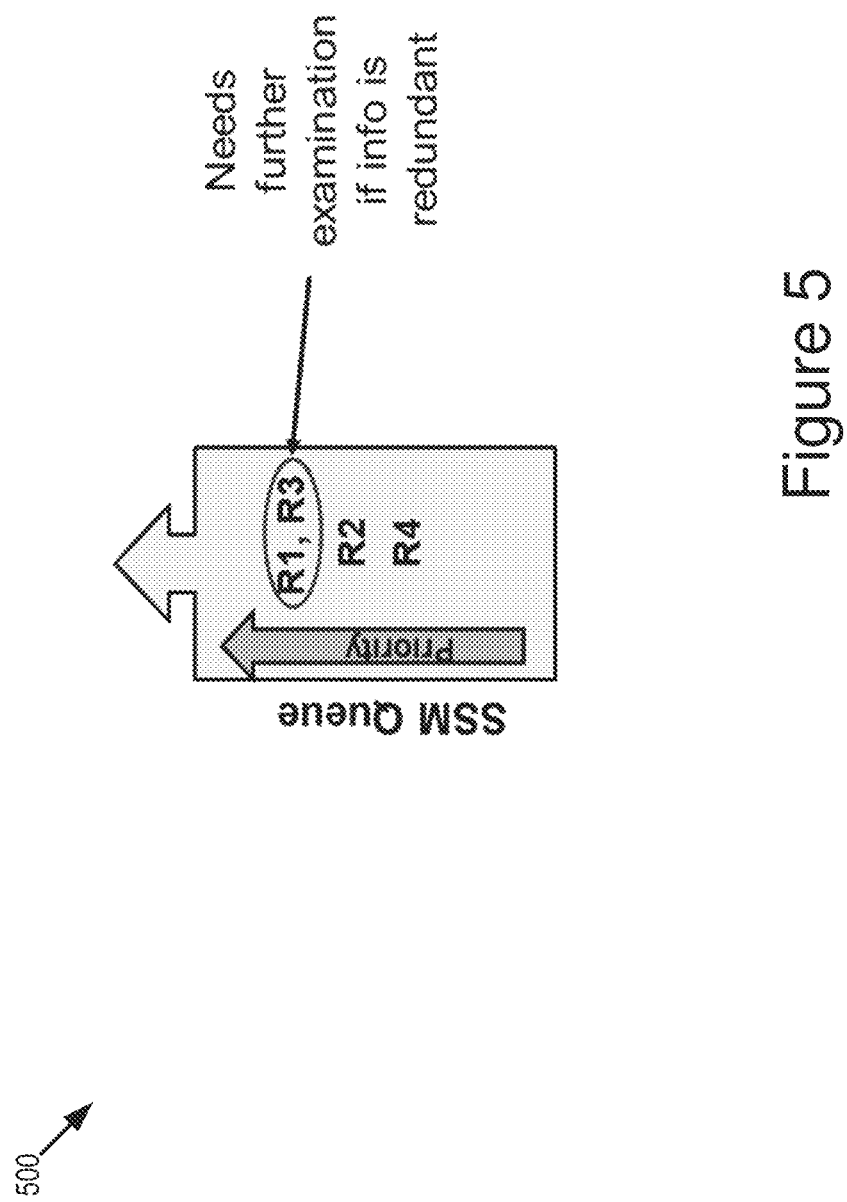
FIG. 5 is a block diagram of an example queue according to some embodiments.

In some embodiments, the wireless message, V2X data, or the remote sensor data received from remote vehicles is ranked in the queue based in part on the priority score for the segment in which they reside (e.g., the location of the remote connected vehicle at the time when sensor measurements are recorded by the forward-facing sensors of remote connected vehicle). Accordingly, with reference to FIG. 4, the remote sensor measurements of remote connected vehicles R1 and R3 are ranked higher in the queue than the remote sensor measurements of remote connected vehicles R2 and R4 because segment a, in which remote connected vehicles R1 and R3 reside at when the sensor measurements of their forward-facing sensors were recorded, has a higher priority than segments d and f in which remote connected vehicles R2 and R4 reside, respectively, at the time when the sensor measurements of their forward-facing sensors were recorded. Similarly, the remote sensor measurements of remote connected vehicle R2 is ranked higher in the queue than the remote sensor measurements of remote connected vehicle R4 because segment d, in which remote connected vehicle R2 resides at when the sensor measurements of its forward-facing sensors were recorded, has a higher priority than segment f in which remote connected vehicle R4 resides at the time when the sensor measurements of its forward-facing sensors were recorded. The queue depicted in FIG. 5 illustrates the ranking described in this paragraph.

In some embodiments, one of the steps described above includes identifying whether the remote sensor data included in the set of V2X data received by the ego vehicle includes redundancies. As described herein, a redundancy includes, for example, instances of remote sensor data from different vehicles that are redundant of one another because their sensory ranges have a degree of commonality which satisfies a threshold. An example of a redundancy is depicted in FIGS. 4 and 5. FIG. 5 depicts a queue which ranks the remote sensor data received by an ego vehicle as depicted in FIG. 4. Referring to FIG. 5, the queue 500 depicted in FIG. 5 includes remote sensor data for remote connected vehicles R1 and R3 as the highest ranked instances of remote senor data stored in the queue. Referring to FIG. 4, remote connected vehicles R1 and R3 are located in a same segment a. Because they are in a same segment, the processing system determines that their respective remote sensor data is redundant of one another to a sufficient degree to satisfy a threshold and so one of the two should be excluded from the rest of the method.

Threshold data includes digital data that describes any threshold described herein. An example of the threshold data includes the threshold data 196 depicted in FIG. 1. Redundancy data includes digital data that describes which elements stored in the queue are redundant of one another as determined by the processing system and, among two sets of redundant elements, which of these redundant elements should be ignored by the processing system going forward. An example of the redundancy data includes the redundancy data 163 depicted in FIG. 1.

Step 9: Process the set of wireless messages (or the set of V2X data included in the set of wireless messages, or the set of remote sensor data included in the set of wireless messages) based on the ranking of the queue so that higher ranked wireless messages (or the set of V2X data included in the set of wireless messages, or the set of remote sensor data included in the set of wireless messages) are processed before lower ranked wireless messages (or the set of V2X data included in the set of wireless messages, or the set of remote sensor data included in the set of wireless messages). In some embodiments, the processing includes executing a verification process to determine or verify that the sensor data measurements included in the payload of the set of wireless messages is sufficiently accurate to satisfy a threshold described by threshold data that is stored in a non-transitory memory of the ego vehicle.

In some embodiments, the "processing" of the wireless messages as described for step 9 of this example general method (or step 335 depicted in FIG. 3B) includes the processing system using the ego sensor data to verify the remote sensor data. In some embodiments, the ego sensor data of the ego vehicle is used to verify the accuracy of the V2X data received from remote connected vehicle which the processing system determines to verify. In some embodiments, processing remote sensor data includes the processing system using verified remote sensor data to improve the richness of detail of the ego sensor data or increase the accuracy of the ego sensor data. In some embodiments, processing remote sensor data includes providing ego sensor data and verified remote sensor data as inputs to a vehicle control system of the ego vehicle so that the vehicle control system provides its functionality based in part on these inputs.

Processing data includes digital data that is the output of the processing provided by the processing system. An example of the processing data includes the processing data 176 depicted in FIG. 1.

In some embodiments, the processing functionality provided by the processing system includes verifying the accuracy of the payload of one or more of the set of wireless messages. In some embodiments, the processing functionality provided by the processing system includes verifying that the transmitter of one or more wireless messages is not transmitting inaccurate sensor measurements or otherwise behaving maliciously. According, in some embodiments the processing data 176 describes verified instances of one or more of the following: one or more of the set of wireless messages; one or more instances of V2X data; and one or more instances of remote sensor data.

Vehicular Micro Clouds

Vehicular micro clouds are an optional feature of some of the embodiments described herein. Some of the embodiments described herein include vehicular micro clouds. For example, some or all of the ego vehicle, the remote connected vehicle, and the recipient vehicle are members of a vehicular micro cloud. Some of the embodiments described herein do not include vehicular micro cloud.

In some embodiments, a vehicular micro cloud includes as a group of connected vehicles where vehicles perform task(s) cooperatively/collaboratively. Vehicular micro clouds can be divided into two categories based on their mobility: (1) stationary; and (2) mobile.

In the stationary cloud, a certain geographical region is designated as the vehicular micro cloud region, and vehicles entering that region contribute their resources for vehicular cloud services. A stationary vehicular micro cloud is sometimes referred to as a "static" vehicular micro cloud.

In the mobile vehicular cloud, on the other hand, the vehicular micro cloud moves as the micro cloud members move. A mobile vehicular micro cloud is sometimes referred to as a "dynamic" vehicular micro cloud.

Vehicular micro clouds provide vehicular micro cloud tasks. A vehicular micro cloud task includes any task executed by a vehicular micro cloud or a group of vehicular micro clouds. As used herein, the terms "task" and "vehicular micro cloud task" refer to the same thing. A "sub-task" as used herein is a portion of a task or vehicular micro cloud task.

A vehicular micro cloud includes a group of connected vehicles that communicate with one another via V2X messages to provide a location data correction service.

The vehicular micro cloud includes multiple members. A member of the vehicular micro cloud includes a connected vehicle that sends and receives V2X messages via the serverless ad-hoc vehicular network. In some embodiments, the members of the serverless ad-hoc vehicular network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed its members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadway device, an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hoc vehicular network includes a set of sensor rich vehicles. A sensor rich vehicle is a connected vehicle that includes a rich sensor set. An operating environment that includes the serverless ad-hoc vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network but receives a benefit of a location data correction service for location data that is provided by the members of the serverless ad-hoc vehicular network. For example, the legacy vehicle is provided with correction data that enables the legacy vehicle to modify its own sensor data to adjust for variances in the sensor measurements recorded by the legacy sensor set relative to the sensor measurements recorded by the rich sensor sets of the sensor rich vehicles that are included in the serverless ad-hoc vehicular network. In this way, the serverless ad-hoc vehicular network is operable to improve the operation of the legacy vehicle, which in turn increases the safety of the sensor rich vehicles that are traveling in a vicinity of the legacy vehicle.

In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments. When describing the vehicular micro cloud, the term "vehicular micro cloud" can be replaced by the term "vehicular micro cloud" since a vehicular micro cloud is an example of a vehicular micro cloud in some embodiments.

Distributed data storage and computing by a group of connected vehicles (i.e., a "vehicular micro cloud") is a promising solution to cope with an increasing network traffic generated for and by connected vehicles. In some embodiments, a vehicular micro cloud is an example of a vehicular micro cloud. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., high-definition road map for automated driving), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a cluster, called a vehicular micro cloud, and collaborate with other micro cloud members over V2V networks or V2X networks to perform computation, data storage, and data communication tasks in an efficient way. These types of tasks are referred to herein as "vehicular micro cloud tasks" if plural, or a "vehicular micro cloud task" if singular.

In some embodiments, a vehicular micro cloud task includes any computational, data storage, or data communication task collaboratively performed by a plurality of the members of a vehicular micro cloud.

In some embodiments, a computational task includes a processor executing code and routines to output a result. The result includes digital data that describes the output of executing the code and routines. For example, a computational task includes a processor executing code and routines to solve a problem, and the result includes digital data that describes the solution to the problem. In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a vehicular micro cloud task is collaboratively performed by the plurality of members executing computing processes in parallel which are configured to complete the execution of the vehicular micro cloud task.

In some embodiments, a vehicular micro cloud includes a plurality of members that execute computing processes whose completion results in the execution of a vehicular micro cloud task. For example, the serverless ad-hoc vehicular network provides a vehicular micro cloud task to a legacy vehicle.

Vehicular micro clouds are beneficial, for example, because they help vehicles to perform computationally expensive tasks that they could not perform alone or store large data sets that they could not store alone.

Vehicular micro clouds are described in the patent applications that are incorporated by reference in this paragraph. This patent application is related to the following patent applications, the entirety of each of which is incorporated herein by reference: U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud"; U.S. patent application Ser. No. 16/443,087 filed on Jun. 17, 2019 and entitled "Cooperative Parking Space Search by a Vehicular Micro Cloud"; U.S. patent application Ser. No. 16/739,949 filed on Jan. 10, 2020 and entitled "Vehicular Micro Clouds for On-demand Vehicle Queue Analysis"; U.S. patent application Ser. No. 16/735,612 filed on Jan. 6, 2020 and entitled "Vehicular Micro Cloud Hubs"; U.S. patent application Ser. No. 16/387,518 filed on Apr. 17, 2019 and entitled "Reorganizing Autonomous Entities for Improved Vehicular Micro Cloud Operation"; U.S. patent application Ser. No. 16/273,134 filed on Feb. 11, 2019 and entitled "Anomaly Mapping by Vehicular Micro Clouds"; U.S. patent application Ser. No. 16/246,334 filed on Jan. 11, 2019 and entitled "On-demand Formation of Stationary Vehicular Micro Clouds"; and U.S. patent application Ser. No. 16/200,578 filed on Nov. 26, 2018 and entitled "Mobility-oriented Data Replication in a Vehicular Micro Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

In some embodiments, the functionality provided by the processing system is a task provided by the vehicular micro cloud. For example, the processing system is an element of a hub of a vehicular micro cloud. The processing system receives a set of wireless messages and this triggers the processing system to form a vehicular micro cloud. The processing system processes V2X data for the benefit of one or more members of the vehicular micro cloud. For example, the ego vehicle includes computational power that exceeds that of another member, and the ego vehicle processes wireless messages for this member which would otherwise be unable to do so, or unable to do so in a timeframe that satisfies a threshold for latency. Hub vehicles are described in more detail below.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. For example, the ego vehicle and remote connected vehicle depicted in FIG. 1 are connected vehicles. A remote unconnected vehicle is not a connected vehicle.

A connected vehicle is a conveyance, such as an automobile, that includes a communication unit that enables the conveyance to send and receive wireless messages via one or more vehicular networks. The embodiments described herein are beneficial for both drivers of human-driven vehicles as well as the autonomous driving systems of autonomous vehicles. For example, the processing system improves the performance of a vehicle control system, which benefits the performance of the vehicle itself by enabling it to operate more safety or in a manner that is more satisfactory to a human driver of the ego vehicle.

In some embodiments, the processing system improves the performance of a network because it beneficially takes steps enable the completion of vehicular micro cloud tasks.

In some embodiments, the processing system is software installed in an onboard unit (e.g., an electronic control unit (ECU)) of a vehicle having V2X communication capability. The vehicle is a connected vehicle and operates in a roadway environment with N number of remote connected vehicles that are also connected vehicles, where N is any positive whole number that is sufficient to satisfy a threshold for forming a vehicular micro cloud. The roadway environment may include one or more of the following example elements: an ego vehicle; N remote connected vehicles; an edge server; and a roadside unit. For the purpose of clarity, the N remote connected vehicles may be referred to herein as the "remote connected vehicle" or the "remote connected vehicles" and this will be understood to describe N remote connected vehicles.

An example of a roadway environment according to some embodiments includes the roadway environment 140 depicted in FIG. 1. As depicted, the roadway environment 140 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote connected vehicles may be human-driven vehicles, autonomous vehicles, or a combination of human-driven vehicles and autonomous vehicles. In some embodiments, the ego vehicle and the remote connected vehicles may be equipped with DSRC equipment such as a GPS unit that has lane-level accuracy and a DSRC radio that is capable of transmitting DSRC messages.

In some embodiments, the ego vehicle and some or all of the remote connected vehicles include their own instance of a processing system. For example, in addition to the ego vehicle, some or all of the remote connected vehicles include an onboard unit having an instance of the processing system installed therein.

In some embodiments, the ego vehicle and one or more of the remote connected vehicles are members of a vehicular micro cloud. In some embodiments, the remote connected vehicles are members of a vehicular micro cloud, but the ego vehicle is not a member of the vehicular micro cloud. In some embodiments, the ego vehicle and some, but not all, of the remote connected vehicles are members of the vehicular micro cloud. In some embodiments, the ego vehicle and some or all of the remote connected vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 1. The vehicular micro cloud 194 is depicted in FIG. 1 using a dashed line to indicate that it is an optional feature of the operating environment 100.

Accordingly, in some embodiments multiple instances of the processing system are installed in a group of connected vehicles. The group of connected vehicles are arranged as a vehicular micro cloud. As described in more detail below, the processing system further organizes the vehicular micro cloud into a set of nano clouds which are each assigned responsibility for completion of a sub-task. Each nano cloud includes at least one member of the vehicular micro cloud so that each nano cloud is operable to complete assigned sub-tasks of a vehicular micro cloud task for the benefit of the members of the vehicular micro cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

Hub or Hub Vehicle

Hub vehicles are an optional feature of the embodiments described herein. Some of the embodiments described herein include a hub vehicle. Some of the embodiments described herein do not include a hub vehicle.

In some embodiments, the processing system that executes a method as described herein (e.g., the method 300 depicted in FIGS. 3A and 3B or the general example method described herein, etc.) is an element of a hub or a hub vehicle. For example, the vehicular micro cloud formed by the processing system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the operating environment 100 includes a roadside unit or some other roadway device, and this roadway device is the hub of the vehicular micro cloud.

In some embodiments, the processing system determines which member vehicle from a group of vehicles (e.g., the ego vehicle and one or more remote connected vehicles) will serve as the hub vehicle based on a set of factors that indicate which vehicle (e.g., the ego vehicle or one of the remote connected vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the processing system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include BSMs which include such sensor data in part 2 of their payload. In some embodiments, the technical data is included in the member data depicted in FIG. 1 which vehicles such as the ego vehicle 123 and the remote connected vehicle 124 broadcast to one another via BSMs. In some embodiments, the member data also includes the sensor data of the vehicle that transmits the BSM as well as some or all of the other digital data described herein as being an element of the member data.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the processing system is operable to provide its functionality to operating environments and network architectures that do not include a server. Use of servers is problematic in some scenarios because they create latency. For example, some prior art systems require that groups of vehicles relay all their messages to one another through a server. By comparison, the use of server is an optional feature for the processing system. For example, the processing system is an element of a roadside unit that includes a communication unit 145 but not a server. In another example, the processing system is an element of another vehicle such as one of the remote connected vehicles 124.

In some embodiments, the operating environment of the processing system includes servers. Optionally, in these embodiments the processing system includes code and routines that predict the expected latency of V2X communications involving serves and then time the transmission of these V2X communications so that the latency is minimized or reduced.

In some embodiments, the processing system is operable to provide its functionality even though the vehicle which includes the processing system does not have a Wi-Fi antenna as part of its communication unit. By comparison, some of the existing solutions require the use of a Wi-Fi antenna in order to provide their functionality. Because the processing system does not require a Wi-Fi antenna, it is able to provide its functionality to more vehicles, including older vehicles without Wi-Fi antennas.

In some embodiments, the processing system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the processing system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud.

In some embodiments, the processing system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the processing system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, in some but not all embodiments, any group of vehicles that includes a server or whose functionality incorporates a server is not a vehicular micro cloud as this term is used herein.

In some embodiments, a vehicular micro cloud formed by a processing system is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the processing system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method 300 depicted in FIGS. 3A and 3B) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 1 depicts a server in an operating environment that includes the processing system, the server is an optional feature of the operating environment. An example of a preferred embodiment of the processing system does not include the server in the operating environment which includes the processing system.

In some embodiments, the processing system enables a group of vehicles to perform computationally expensive tasks that could not be completed by any one vehicle in isolation.

An existing solution to vehicular micro cloud task execution involves vehicle platoons. As explained herein, a platoon is not a vehicular micro cloud and does not provide the benefits of a vehicular micro cloud, and some embodiments of the processing system requires vehicular micro cloud; this distinction alone differentiates the processing system from the existing solutions. The processing system is different from the existing solution for additional reasons. For example, the existing solution that relies on vehicle platooning does not include functionality whereby the members of a platoon are changed among the platoons dynamically during the task execution. As another example, the existing solution does not consider the task properties, road geometry, actual and/or predicted traffic information and resource capabilities of vehicles to determine the number of platoons. The existing solution also does not include functionality whereby platoons swap which sub-task they are performing among themselves while the sub-tasks are still being performed by the platoons in parallel. The existing solution also does not include functionality whereby platoons are reorganized based on monitored task executions results/performance and/or available vehicles and resources. As described herein, the processing system includes code and routines that provide, among other things, all of this functionality which is lacking in the existing solution.

Vehicle Control System

Modern vehicles include Advanced Driver Assistance Systems (ADAS systems) or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIG. 2.

A particular vehicle that includes these vehicle control systems is referred to herein as an "ego vehicle" and other vehicles in the vicinity of the ego vehicle as "remote connected vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping vehicles to have the best possible environmental perception abilities.

Vehicles use their onboard sensors and computing resources to execute perception algorithms that inform them about the objects that are in their environment, where these objects are located in their environment, and various measurements about these objects (e.g., speed, heading, path history, etc.).

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 150 depicted in FIG. 1.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

75 MHz of the 5.9 GHz band may be designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHz). In these embodiments, the processing system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

Vehicular Network

In some embodiments, the processing system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

In some embodiments, the processing system includes software installed in an onboard unit of a connected vehicle. This software is the "processing system" described herein.

An example operating environment for the embodiments described herein includes an ego vehicle, one or more remote connected vehicles, and a recipient vehicle. The ego vehicle the remote connected vehicle are connected vehicles having communication units that enable them to send and receive wireless messages via one or more vehicular networks. In some embodiments, the recipient vehicle is a connected vehicle. In some embodiments, the ego vehicle and the remote connected vehicle include an onboard unit having a processing system stored therein.

Some of the embodiments described herein include a server. However, some of the embodiments described herein do not include a server. An example of a preferred embodiment of the processing system includes a serverless operating environment. A serverless operating environment is an operating environment which includes at least one processing system and does not include a server.

In some embodiments, the processing system includes code and routines that are operable, when executed by a processor of the onboard unit, to cause the processor to execute one or more of the steps of the method 300 depicted in FIGS. 3A and 3B or any other method described herein.

In some embodiments, the processing system includes code and routines that are operable, when executed by a processor of the onboard unit, to cause the processor to execute one or more of the steps of the two-step queue process to prioritize V2X messages described herein. In some embodiments, the processing system includes code and routines that are operable, when executed by a processor of the onboard unit, to cause the processor to execute one or more of the steps of the direct verification procedure (see, e.g., FIG. 6) described herein. In some embodiments, the processing system includes code and routines that are operable, when executed by a processor of the onboard unit, to cause the processor to execute one or more of the steps of the prediction-based verification procedure based on history data (see, e.g., FIG. 7) described herein. In some embodiments, the processing system includes code and routines that are operable, when executed by a processor of the onboard unit, to cause the processor to execute one or more of the steps of the subscription-based verification procedure (see, e.g., FIG. 8) described herein.

This patent application is related to U.S. patent application Ser. No. 15/644,197 filed on Jul. 7, 2017 and entitled "Computation Service for Mobile Nodes in a Roadway Environment," the entirety of which is hereby incorporated by reference. This patent application is also related to U.S.

patent application Ser. No. 16/457,612 filed on Jun. 28, 2019 and entitled "Context System for Providing Cyber Security for Connected Vehicles," the entirety of which is hereby incorporated by reference.

Example Overview

In some embodiments, the processing system is software that is operable to manage the V2X messages that are transmitted by a vehicle such as the ego vehicle. In some embodiments, the processing system is stored in an onboard unit of the ego vehicle.

An example operating environment 100 for the processing system is depicted in FIG. 1.

In some embodiments, the processing system 199 is software installed in an onboard unit (e.g., an electronic control unit (ECU)) of a particular make of vehicle having V2X communication capability. For example, the ego vehicle 123 includes a communication unit 145. The communication unit 145 includes a V2X radio. FIG. 1 depicts an example operating environment 100 for the processing system 199 according to some embodiments.

Example Operative Environment

Embodiments of the processing system are now described. Referring now to FIG. 1, depicted is a block diagram illustrating an operating environment 100 for a processing system 199 according to some embodiments. The operating environment 100 is present in a roadway environment 140. In some embodiments, each of the elements of the operating environment 100 is present in the same roadway environment 140 at the same time. In some embodiments, some of the elements of the operating environment 100 are not present in the same roadway environment 140 at the same time.

The operating environment 100 may include one or more of the following elements: an ego vehicle 123 (referred to herein as a "vehicle 123" or an "ego vehicle 123"); a remote connected vehicle 124. These elements are communicatively coupled to one another via a network 105. The operating environment 100 also includes an object of interest 151, which is not communicatively coupled to the network 105. These elements of the operating environment 100 are depicted by way of illustration. In practice, the operating environment 100 may include one or more of the elements depicted in FIG. 1.

The object of interest 151 includes an object for which the processing system 199 determines that additional information is needed. For example, the processing system 199 determines that the ego sensor data 195 indicates a presence of one or more objects on the roadway and also that the ego sensor data 195 includes insufficient sensor measurements about the one or more objects to satisfy a threshold described by the threshold data 196. The processing system 199 therefore determines that the one or more objects are an object of interest 151. In some embodiments, the description herein of the processing system 199 identifying the presence of an unconnected vehicle in the roadway (see, e.g., step 3 of the example general method and step 305 of method 300 depicted on FIG. 3A) is an example of the processing system 199 identifying an object of interest 151.

In some embodiments, the object of interest 151 is a set of remote unconnected vehicles. A remote unconnected vehicle includes a vehicle which is not a connected vehicle. The remote unconnected vehicle includes some or all of the same elements as the ego vehicle 123 with the exception being that the remote unconnected vehicle does not include a communication unit 145. The set of remote unconnected vehicles includes one or more remote unconnected vehicles.

In some embodiments, the operating environment includes a set of remote connected vehicles 198 which is communicatively coupled to the network 105. The set of remote connected vehicles 198 includes one or more remote connected vehicles 124.

The operating environment 100 also includes the roadway environment 140. The roadway environment 140 was described above, and that description will not be repeated here.

In some embodiments, one or more of the ego vehicle 123, the remote connected vehicle 124, the set of remote connected vehicles 198, and the network 105 are elements of a vehicular micro cloud 194.

In some embodiments, the ego vehicle 123 and the remote connected vehicle 124 include similar elements. For example, each of these elements of the operating environment 100 include their own processor 125, bus 121, memory 127, communication unit 145, processor 125, sensor set 126, onboard unit 139, standard-compliant GPS unit 150, and processing system 199. These elements of the ego vehicle 123 and the remote connected vehicle 124 provide the same or similar functionality regardless of whether they are included in the ego vehicle 123 or the remote connected vehicle 124. Accordingly, the descriptions of these elements will not be repeated in this description for each of the ego vehicle 123 and the remote connected vehicle 124.

In the depicted embodiment, the ego vehicle 123 and the remote connected vehicle 124 store similar digital data.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. The vehicular micro cloud 194 is depicted with a dashed line in FIG. 1 to indicate that it is an optional element of the operating environment 100.

In some embodiments, the vehicular micro cloud 194 includes a stationary vehicular micro cloud or a mobile vehicular micro cloud. For example, each of the ego vehicle 123 and the remote connected vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used herein, the terms a "vehicular micro cloud" and a "micro-vehicular cloud" mean the same thing.

In some embodiments, the vehicular micro cloud 194 is a vehicular micro cloud such as the one described in U.S. patent application Ser. No. 15/799,963.

In some embodiments, the vehicular micro cloud 194 includes a dynamic vehicular micro cloud. In some embodiments, the vehicular micro cloud 194 includes an interdependent vehicular micro cloud. In some embodiments, the vehicular micro cloud 194 is sub-divided into a set of nano clouds.

In some embodiments, the operating environment 100 includes a plurality of vehicular micro clouds 194. For example, the operating environment 100 includes a first vehicular micro cloud and a second vehicular micro cloud.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote connected vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 171 describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the member data 171 describes the logical associations between more than one vehicular micro cloud. For example, the member data 171 describes the logical associations between the first vehicular micro cloud and the second vehicular micro cloud. Accordingly, in some embodiments the memory 127 includes member data 171 for more than one vehicular micro cloud 194.

In some embodiments, the vehicular micro cloud 194 does not include a hardware server. Accordingly, in some embodiments the vehicular micro cloud 194 may be described as serverless. In some embodiments, the vehicular micro cloud 194 includes a server. For example, in some embodiments the edge server 104 is the hub of the vehicular micro cloud 194.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network. In some embodiments, the network 105 is a C-V2X network.

The network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote connected vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote connected vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125; a sensor set 126; a standard-compliant GPS unit 150; a vehicle control system 153 (see, e.g., FIG. 2); a communication unit 145; an onboard unit 139; a memory 127; and a processing system 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 is an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the processing system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 records sensor measurements that describe the ego vehicle 123 and/or the physical environment (e.g., the roadway environment 140) that includes the ego vehicle 123. The ego sensor data 195 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record ego sensor data 195. The ego sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. In some embodiments, the roadway environment 140 is a roadway that includes a roadway region. The ego sensor data 195 may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the processing system 199 based on analysis of the ego sensor data 195 which is recorded by the ego vehicle 123 and/or one or more members of the vehicular micro cloud 194.

In some embodiments, the ego sensor data 195 includes digital data that describes all of the sensor measurements recorded by the sensor set 126 of the ego vehicle.

For example, the ego sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123. The depth information and the images describe the roadway environment 140, including the object of interest 151 which is in the roadway environment 140.

In some embodiments, the sensors of the sensor set 126 are operable to collect ego sensor data 195. The sensors of the sensor set 126 include any sensors that are necessary to measure and record the measurements described by the ego sensor data 195. In some embodiments, the ego sensor data 195 includes any sensor measurements that are necessary to generate the other digital data stored by the memory 127. In some embodiments, the ego sensor data 195 includes digital data that describes any sensor measurements that are necessary for the processing system 199 provides its functionality as described herein with reference to the method 300 depicted in FIGS. 3A and 3B.

In some embodiments, the sensor set 126 includes any sensors that are necessary to record ego sensor data 195 that describes the roadway environment 140 in sufficient detail to create a digital twin of the roadway environment 140. In some embodiments, the processing system 199 generates the set of nano clouds and assigns sub-tasks to the nano clouds based on the outcomes observed by the processing system 199 during the execution of a set of digital twins that simulate the real-life circumstances of the ego vehicle 123.

For example, in some embodiments the processing system 199 includes simulation software. The simulation software is any simulation software that is capable of simulating an execution of a vehicular micro cloud task by the vehicular micro cloud 194. For example, the simulation software is a simulation software that is capable of conducting a digital twin simulation. In some embodiments, the vehicular micro cloud 194 is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the processing system 199. In some other embodiments, the simulation software is a standalone software that the processing system 199 can access to execute digital twin simulations to determine the best way to divide the vehicular micro cloud 194 into nano clouds and which sub-tasks to assign which nano clouds. The digital twin simulations may also be used by the processing system 199 to determine how to break down the vehicular micro cloud task into sub-tasks.

In some embodiments, the digital twin simulations are used for one or more of the following steps: identifying objects of interest; segmenting the roadway into a plurality of segments; assigning priority scores to segments; classifying wireless messages, V2X data, and/or remote sensor data; and ranking wireless messages, V2X data, and/or remote sensor data in a data structure such as a queue.

Digital twins, and an example process for generating and using digital twins which is implemented by the processing system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

The ego sensor data 195 includes digital data that describes any measurement that is taken by one or more of the sensors of the sensor set 126.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this ego vehicle 123 as provided by the standard-compliant GPS unit 150.

An example process for generating GPS data describing a geographic location of an object (e.g., a vehicle, a roadway object, an object of interest, a remote connected vehicle 124, the ego vehicle 123, or some other tangible object or construct located in a roadway environment 140) is now described according to some embodiments. In some embodiments, the processing system 199 include code and routines that are operable, when executed by the processor 125, to cause the processor to: analyze (1) GPS data describing the geographic location of the ego vehicle 123 and (2) ego sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the processing system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the processing system 199 to determine the lane of travel of the ego vehicle 123. This measurement improves the accuracy of the GPS data describing the location of lanes used by the ego vehicle 123 when the processing system 199 is providing its functionality.

In some embodiments, the memory 127 stores two types of GPS data. The first is GPS data of the ego vehicle 123 and the second is GPS data of one or more objects (e.g., the remote connected vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the ego sensor data 195. For example, the standard-compliant GPS unit 150 is a sensor included in the sensor set 126 and the GPS data is an example type of ego sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the processing system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369, 262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIGS. 3A and 3B are transmitted by the C-V2X radio on the upper 30 MHz of the 5.9 GHz band (i.e., 5.895-5.925 GHz) as directed by the processing system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards or any other wireless communication standard that applies to wireless vehicular communications. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the ego sensor data 195; the threshold data 196; the member data 171; the dynamic data 191; the assignment data 175; the processing data 176; the V2X data 133; the remote sensor data 197; the value data 144; the classification data 172; the data structure 173; the ranking data 174; the segment data 177; the history data 161; the sensing data 129; the interest data 167; the location data 168; the roadway data 166; the subscription data 162; and the redundance data 163. In some embodiments, the V2X messages (or C-V2X messages or the set of wireless messages) described herein are also stored in the memory 127. The above-described elements of the memory 127 were described above, and so, those descriptions will not be repeated here.

A queue as described herein is an example of a data structure 173 according to some embodiments. Accordingly, the term "queue" as used herein is replaceable with the term "data structure."

In some embodiments, the ego vehicle 123 includes a vehicle control system. A vehicle control system includes one or more ADAS systems or an autonomous driving system. In some embodiments, the processing system 199 uses some or all of the payload of the set of wireless messages described herein as inputs to the vehicle control system to improve the operation of the vehicle control by increasing the quantity of data it has access to when controlling the operation of the ego vehicle 123. In some embodiments, the processing system 199 only provides instances of digital data (e.g., remote sensor data 197) which have been verified by the processing functionality provided by the processing system 199 as described herein, which further improves the functionality of the vehicle control system by ensuring that it does not provide its functionality using inaccurate or false data as a basis for vehicle control decisions. In some embodiments, the processing system 199 only provides instances of digital data (e.g., remote sensor data 197) which are not redundant of other instances of digital data, which further improves the functionality of the vehicle control system by decreasing the instances of digital data it must consider which also decreases latency in the operation of the vehicle control system. In some embodiments, the processing system 199 only provides instances of digital data (e.g., remote sensor data 197) which have been verified by the processing functionality provided by the processing system 199 and which are not redundant of other instances of digital data.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness processing system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the ego vehicle 123 and modify (or control) the operation of its host vehicle (e.g., the ego vehicle 123) to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle 123 may have a LKA system installed and operational in an ego vehicle 123 may detect, using one or more external cameras of the ego vehicle 123, an event in which the ego vehicle 123 is near passing a center yellow line which indicates a division of one lane of travel from another lane of travel on a roadway. The LKA system may provide a notification to a driver of the ego vehicle 123 that this event has occurred (e.g., an audible noise or graphical display) or take action to prevent the ego vehicle 123 from actually passing the center yellow line such as making the steering wheel difficult to turn in a direction that would move the ego vehicle over the center yellow line or actually moving the steering wheel so that the ego vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the processing system 199 includes code and routines that are operable, when executed by the processor 125, to execute one or more steps of the example general method described herein. In some embodiments, the processing system 199 includes code and routines that are operable, when executed by the processor 125, to execute one or more steps of the method 300 described below with reference to FIGS. 3A and 3B.

In some embodiments, the processing system 199 includes code and routines that are operable, when executed by a processor 125, to cause the processor 125 to execute one or more of the steps of the two-step queue process to prioritize V2X messages described herein. In some embodiments, the processing system 199 includes code and routines that are operable, when executed by a processor 125, to cause the processor 125 to execute one or more of the steps of the direct verification procedure (see, e.g., FIG. 6) described herein. In some embodiments, the processing system 199 includes code and routines that are operable, when executed by a processor 125, to cause the processor 125 to execute one or more of the steps of the prediction-based verification procedure based on history data 161 (see, e.g., FIG. 7) described herein. In some embodiments, the processing system 199 includes code and routines that are operable, when executed by a processor 125, to cause the processor 125 to execute one or more of the steps of the subscription-based verification procedure (see, e.g., FIG. 8) described herein.

Figure 2:
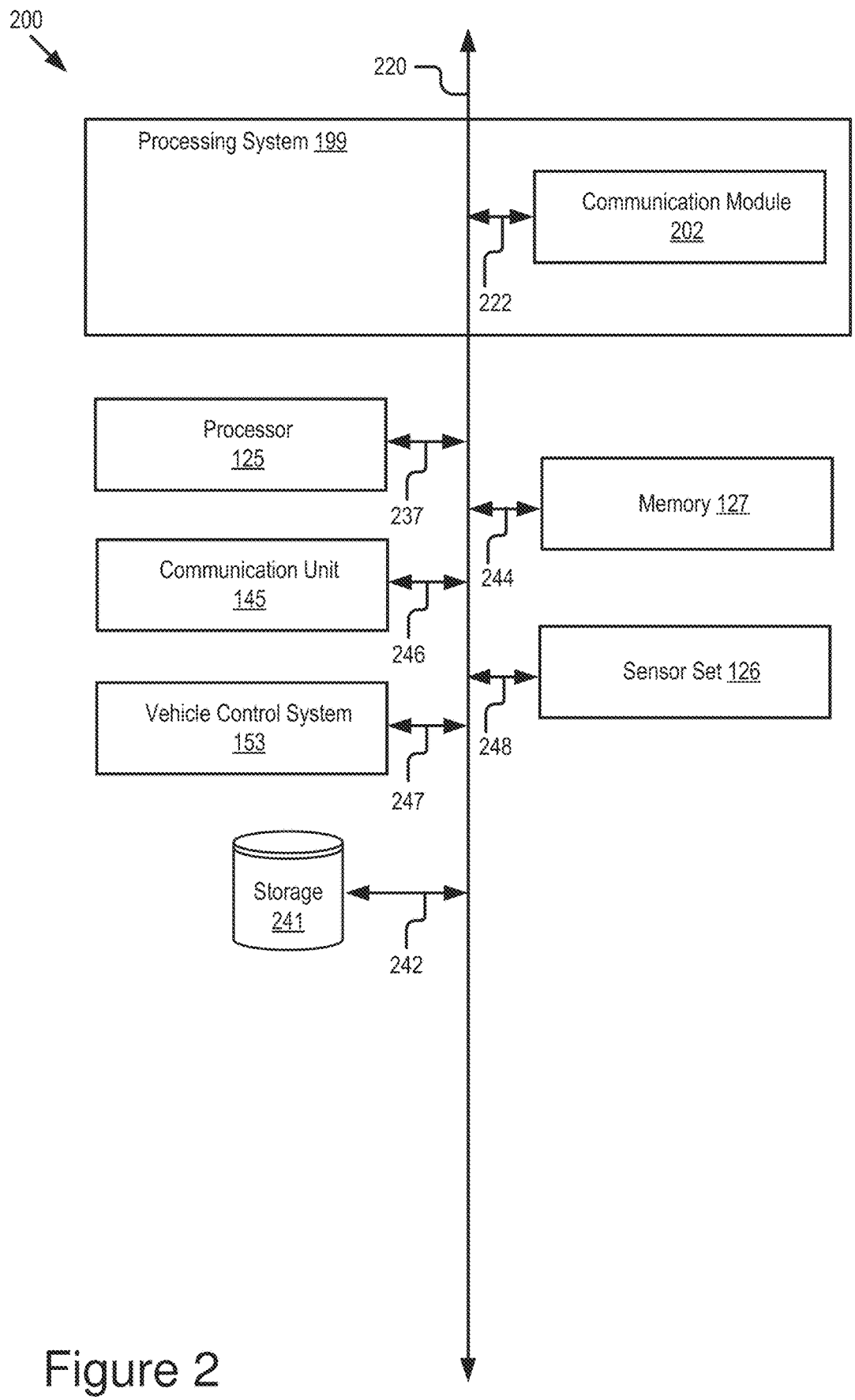
FIG. 2 is a block diagram illustrating an example computer system including a processing system according to some embodiments.

An example embodiment of the processing system 199 is depicted in FIG. 2. This embodiment is described in more detail below.

In some embodiments, the processing system 199 is an element of the onboard unit 139 or some other onboard vehicle computer. In some embodiments, the processing system 199 includes code and routines that are stored in the memory 127 and executed by the processor 125 or the onboard unit 139. In some embodiments, the processing system 199 is an element of an onboard unit of the ego vehicle 123 which executes the processing system 199 and controls the operation of the communication unit 145 of the ego vehicle 123 based at least in part on the output from executing the processing system 199.

In some embodiments, the processing system 199 is implemented using hardware including a field-programmable gate array ("FPGA") or an application-specific integrated circuit ("ASIC"). In some other embodiments, the processing system 199 is implemented using a combination of hardware and software.

The remote connected vehicle 124 includes elements and functionality which are similar to those described above for the ego vehicle 123, and so, those descriptions will not be repeated here. In some embodiments, the ego vehicle 123 and the remote connected vehicle 124 are members of a vehicular micro cloud 194.

The roadway environment 140 is now described according to some embodiments. In some embodiments, some, or all of the ego vehicle 123, the remote connected vehicle 124 (or the set of remote connected vehicles 198), and the object of interest 151 are located in a roadway environment 140. In some embodiments, the roadway environment 140 includes one or more vehicular micro clouds 194. The roadway environment 140 is a portion of the real-world that includes a roadway, the ego vehicle 123, the remote connected vehicle 124, and the object of interest 151. The roadway environment 140 may include other elements such as roadway signs, environmental conditions, traffic, etc. The roadway environment 140 includes some or all of the tangible and/or measurable qualities described above with reference to the ego sensor data 195 and the remote sensor data 197. The remote sensor data 197 includes digital data that describes the sensor measurements recorded by the sensor set 126 of the remote connected vehicle 124.

In some embodiments, the real-world includes the real of human experience comprising physical objects and excludes artificial environments and "virtual" worlds such as computer simulations.

In some embodiments, the roadway environment 140 includes a roadside unit that in includes an edge server (not pictured). In some embodiments, the edge server is a connected processor-based computing device that includes an instance of the processing system 199 and the other elements described above with reference to the ego vehicle 123 (e.g., a processor 125, a memory 127, a communication unit 145, etc.). In some embodiments, the roadway device is a member of the vehicular micro cloud 194.

In some embodiments, the edge server is one or more of the following: a hardware server; a personal computer; a laptop; a device such as a roadside unit; or any other processor-based connected device that is not a member of the vehicular micro cloud 194 and includes an instance of the processing system 199 and a non-transitory memory that stores some or all of the digital data that is stored by the memory 127 of the ego vehicle 123 or otherwise described herein. For example, the memory 127 stores the system data (not pictured). The system data includes some or all of the digital data depicted in FIG. 1 as being stored by the memory 127.

In some embodiments, the edge server includes a backbone network. In some embodiments, the edge server includes an instance of the processing system 199. The functionality of the processing system 199 is described above with reference to the ego vehicle 123, and so, that description will not be repeated here.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote connected vehicle 124, etc.), and optionally devices such as a roadway device, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third generation (3G), fourth generation (4G), fifth generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the processing system 199 includes encryption keys for encrypting wireless messages and decrypting the wireless messages described herein.

Referring now to FIG. 2, depicted is a block diagram illustrating an example computer system 200 including a processing system 199 according to some embodiments.

In some embodiments, the computer system 200 may include a special-purpose computer system that is programmed to perform one or more steps of one or more of the method 300 described herein with reference to FIGS. 3A and 3B and the example general method described above.

In some embodiments, the computer system 200 may include a special-purpose computer system that is programmed to perform one or more steps of the two-step queue process to prioritize V2X messages described herein. In some embodiments, the computer system 200 may include a special-purpose computer system that is programmed to perform one or more steps of the direct verification procedure (see, e.g., FIG. 6) described herein. In some embodiments, the computer system 200 may include a special-purpose computer system that is programmed to perform one or more steps of the prediction-based verification procedure based on history data 161 (see, e.g., FIG. 7) described herein. In some embodiments, the computer system 200 may include a special-purpose computer system that is programmed to perform one or more steps of the subscription-based verification procedure (see, e.g., FIG. 8) described herein.

In some embodiments, the computer system 200 may include a processor-based computing device. For example, the computer system 200 may include an onboard vehicle computer system of the ego vehicle 123 or the remote connected vehicle 124.

The computer system 200 may include one or more of the following elements according to some examples: the processing system 199; a processor 125; a communication unit 145; a vehicle control system 153; a storage 241; and a memory 127. The components of the computer system 200 are communicatively coupled by a bus 220.

In some embodiments, the computer system 200 includes additional elements such as those depicted in FIG. 1 as elements of the processing system 199.

In the illustrated embodiment, the processor 125 is communicatively coupled to the bus 220 via a signal line 237. The communication unit 145 is communicatively coupled to the bus 220 via a signal line 246. The vehicle control system 153 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the communication unit 145; the vehicle control system 153; the memory 127; and the sensor set 126.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the processing system 199 includes code and routines that are operable, when executed by the processor 125, to cause the processor 125 to execute one or more steps of the method 300 described herein with reference to FIGS. 3A and 3B. In some embodiments, the processing system 199 includes code and routines that are operable, when executed by the processor 125, to cause the processor 125 to execute one or more steps of the first example general method.

In the illustrated embodiment shown in FIG. 2, the processing system 199 includes a communication module 202.

The communication module 202 can be software including routines for handling communications between the processing system 199 and other components of the computer system 200. In some embodiments, the communication module 202 can be a set of instructions executable by the processor 125 to provide the functionality described below for handling communications between the processing system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the processing system 199 and stores the data in one or more of the storage 241 and the memory 127.

In some embodiments, the communication module 202 may handle communications between components of the processing system 199 or the computer system 200.

Referring now to FIGS. 3A and 3B, depicted is a flowchart of an example method 300. The method 300 includes step 305, step 310, step 315, step 320, step 325, and step 330 as depicted in FIG. 3A. The method 300 also includes step 335 depicted in FIG. 3B. The steps of the method 300 may be executed in any order, and not necessarily those depicted in FIGS. 3A and 3B. In some embodiments, one or more of the steps are skipped or modified in ways that are described herein or known or otherwise determinable by those having ordinary skill in the art of vehicular micro clouds.

Example differences in technical effect between the method 300 and the prior art are described below. These examples are illustrative and not exhaustive of the possible differences.

The existing solutions do not identify a location of an object of interest in a roadway as described herein. The existing solutions also do not segment a roadway into a plurality of segments using dynamic data and the location of an object of interest as described herein.

The existing solutions also do not assign priority scores to segments as described herein. For example, the existing solutions do not consider the forward-facing sensors as is done by the priority system.

The existing solutions also do not check for and exclude redundant instances of remote sensor data as described herein.

The existing solutions also do not utilize subscription data as described herein or the process for subscriptions as described herein with reference to FIG. 7.

The existing solutions also do not utilize history data as described herein or the process for considering history data as described herein with reference to FIG. 8.

The existing solutions also do not utilize vehicular micro clouds to process a set of wireless messages as described herein. Some of the existing solutions require the use of vehicle platooning. A platoon is not a vehicular micro cloud and does not provide the benefits of a vehicular micro cloud, and some embodiments of the processing system that require a vehicular micro cloud. For example, among various differences between a platoon and a vehicular micro cloud, a platoon does not include a hub or a vehicle that provides the functionality of a hub vehicle.

Referring now to FIG. 4, depicted is a block diagram of an example use case 400 of the processing system according to some embodiments.

In some embodiments, the two-step queue process provided by the processing system of an ego vehicle provides its functionality based on locality sensitive hashing. In some embodiments, this two-step process only considers the forward-facing sensors of the remote connected vehicle when executing the two-step queue process. In this use case 400 only the forward-sensing range of remote connected vehicles R1, R2, R3, R4 are transmitted to the processing system of the ego vehicle or considered by the processing system of the ego vehicle when providing its functionality.

In some embodiments, the processing system splits the roadway into segments. The segments that are closest to the ego vehicle receive priority. For example, in the use case 400 the road is split into segments as described in the following list: a; b; c; d; e; and f. This list is provided in order from highest priority (e.g., "a") to lowest priority (e.g., "f").

An example of locality sensitive hashing is now described. In some embodiments, the priority system of the ego vehicle E classifies all wireless messages received by the ego vehicle based on the sensor coverage of the segments. If a remote connected vehicle has sufficient coverage in a given segment or detects an object of interest in a given segment, then the processing classifies that as a "1." Otherwise, the processing system classifies this as a "0." The processing system outputs a hash code for each remote connected vehicle following the following template (a, b, c, d, e, f). For example, in FIG. 4: the hash code for R1 is (1, 0, 1, 0, 0, 0); the hash code for R2 is (0, 1, 0, 1, 0, 0); the hash code for R3 is (1, 0, 1, 0, 0, 0); and the hash code for R4 is (0, 0, 0, 1, 0, 1). The priority system gives priority to V2X data received from remote connected vehicles having the closest hash code to the ego vehicle.

Referring now to FIG. 5, depicted is a block diagram of an example queue 500 according to some embodiments. FIG. 5 depicts the queue for the use case 400 depicted in FIG. 4. In this example, the V2X data for R1 and R3 are determined to be candidates for redundancy because they are located in the same segment.

An alternative embodiment for ranking a queue is now described. In some embodiments, for each wireless message received by the ego vehicle E, and each object included, the processing system of the ego vehicle compares prior instances of V2X data that the ego vehicle E has already received (e.g., position $\bar{x}$, velocity $\bar{v}$) to the posterior instances of V2X data that the ego vehicle E would know provided it receives a wireless message from a given remote connected vehicle.

For example, the prior instances of V2X data that the ego vehicle E has of "r1" and "r2" is denoted by $(\bar{x}_{r1}, \bar{v}_{r1})$, $(\bar{x}_{r2}, \bar{v}_{r2})$. The posterior instances of V2X data that the ego vehicle has of "r1" and "r2" given R1's wireless message is denoted by $(\bar{x}_{r1}^{(R1)}, \bar{v}_{r1}^{(R1)})$, $(\bar{x}_{r2}^{(R1)}, \bar{v}_{r2}^{(R1)})$. The posterior instances of V2X data that the ego vehicle has of "r1" and "r2" given R3's wireless message is denoted by $(\bar{x}_{r1}^{(R3)}, \bar{v}_{r1}^{(R3)})$, $(\bar{x}_{r2}^{(R3)}, \bar{v}_{r2}^{(R3)})$. If the posterior instances of V2X data is significantly different than the prior instances of V2X data about a specific vehicle "r1" or "r2"" such that a threshold for difference is satisfied, then the processing system considers the corresponding V2X data valuable.

Figure 6:
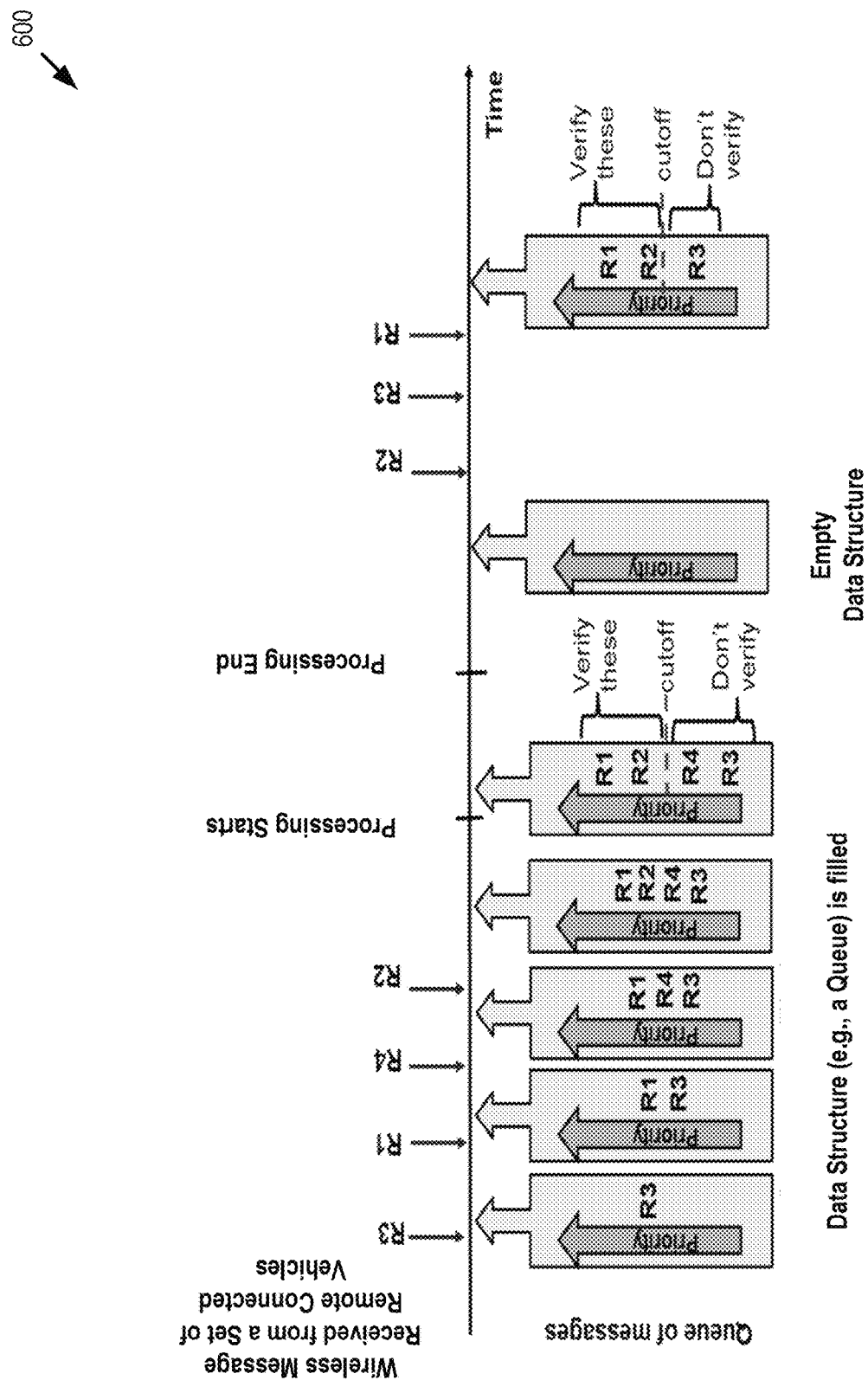
FIG. 6 is a block diagram of an example use case of ranking wireless messages in a queue according to some embodiments.

Referring now to FIG. 6, depicted is a block diagram of an example use case 600 of ranking wireless messages in a queue according to some embodiments.

In this example process, every wireless message enters the queue and is processed by the processing system to determine whether it needs to be verified. Every single message is evaluated independently of past messages from the same remote connected vehicle to determine verification. In some embodiments, this strategy is applied by the processing system when the penetration of connected vehicles is low based on a determination by the processing system that a threshold for penetration being unsatisfied.

Referring now to FIG. 7, depicted is a block diagram of an example use case 700 of ranking wireless messages in a queue using a subscription period according to some embodiments.

In this example process, the processing system of the ego vehicle determines which remote connected vehicles to subscribe to for verification and which remote connected vehicles will not be verified by the processing system. If a remote connected vehicle is subscribed to by the processing system, then this means that the processing system will verify the V2X data included in the payload of the wireless messages transmitted by this remote connected vehicle. After the subscription period, the wireless messages from remote connected vehicles that are subscribed to by the processing system are verified by the processing system in the verification period until the verification deadline.

Referring now to FIG. 8, depicted is a block diagram of an example use case 800 of ranking wireless messages in a queue using history data according to some embodiments.

In this example process, the processing system of the ego vehicle uses the V2X data included in wireless messages received for particular remote connected vehicles in the past to determine whether to verify wireless messages from the same remote connected vehicles in the future. In some embodiments, during a first reception period and a first classification period, the processing system of the ego vehicle receives wireless messages from remote connected vehicles and determines which wireless messages it will verify in a second reception period and a second classification period using the ranking data determined in the first reception period and the first classification period which occurred earlier.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method executed by a processor of an ego vehicle, the method comprising:
   determining, by the processor of the ego vehicle, a location of an object of interest in a roadway environment that includes the ego vehicle and a set of remote connected vehicles, wherein the remote connected vehicles included in the set are equipped with forward-facing sensors;
   segmenting the roadway environment into a plurality of segments;
   assigning a priority score to a first segment within the plurality of segments based on (1) whether the forward-facing sensors of the remote connected vehicles present in the first segment are capable of measuring the object of interest and (2) proximity of the remote connected vehicles in the first segment to the object of interest; and
   repeating the assignment step for each segment within the plurality of segments, wherein the assignment step is configured so higher priority scores are assigned to individual segments if the remote connected vehicles present in the individual segments have forward-facing sensors that are capable of measuring the object of interest and the remote connected vehicles present in the individual segments are closer to the object of interest.

2. The method of claim 1, further comprising:
   receiving, by a communication unit of the ego vehicle, a set of wireless messages from the set of remote connected vehicles;
   assigning classification data to each remote connected vehicle included in the set of remote connected vehicles by executing a classification process that includes determining which particular remote connected vehicle transmitted each wireless message, determining which segments of the plurality of segments are within sensory range of the forward-facing sensors of the particular remote connected vehicle, and outputting the classification data to assign to the each remote connected vehicle based on which of the individual segments within the plurality of segments are within the sensory range of the each remote connected vehicle and their corresponding priority scores;
   ranking the set of wireless messages in a queue based on the classification data assigned to each transmitter of each of the set of wireless messages; and
   processing the set of wireless messages based on the ranking of the queue so that higher ranked wireless messages are processed before lower ranked wireless messages.

3. The method of claim 2, wherein the set of wireless messages include sensor data shared with the remote connected vehicle by the set remote connected vehicles.

4. The method of claim 2, further comprising determining that the set of wireless messages includes a redundant payload and excluding the redundant payload from the processing.

5. The method of claim 2, wherein payloads of the set of wireless messages include sensor measurements and the processor of the ego vehicle is attempting to determine information about the object of interest based at least in part on the sensor measurements with minimized latency.

6. The method of claim 2, wherein the processing includes a verification process to determine whether payloads of the set of wireless messages includes sensor measurements that satisfy a threshold for accuracy.

7. The method of claim 2, wherein the classification data for the each remote connected vehicle is a value indicator of sensor data measurements included in the wireless messages transmitted by each the remote connected vehicles.

8. The method of claim 1, wherein the remote connected vehicles in each segment are within a same range of proximity relative to the object of interest.

9. The method of claim 1, wherein the remote connected vehicles in each segment share a similar ability to measure the object of interest using their forward-facing sensors.

10. The method of claim 1, wherein the object of interest includes a set of remote unconnected vehicles.

11. The method of claim 1, wherein the segmenting occurs dynamically in substantially real time based on one or more dynamic factors.

12. The method of claim 11, wherein the one or more dynamic factors are selected from a group that includes: a first speed of the ego vehicle; a first acceleration of the ego vehicle; a second speed of the set of remote connected vehicles; a second acceleration of the set of remote connected vehicles; and the location of the object of interest in the roadway environment relative to locations of the ego vehicle and the set of remote connected vehicles.

13. A system of an ego vehicle comprising:
a communication unit;
a non-transitory memory;
and a processor communicatively coupled to the communication unit and the non-transitory memory, wherein the non-transitory memory stores computer readable code that is operable, when executed by the processor, to cause the processor to execute steps including:
determining a location of an object of interest in a roadway environment that includes the ego vehicle and a set of remote connected vehicles, wherein the remote connected vehicles included in the set are equipped with forward-facing sensors;
segmenting the roadway environment into a plurality of segments; and
assigning a priority score to a first segment within the plurality of segments based on (1) whether the forward-facing sensors of the remote connected vehicles present in the first segment are capable of measuring the object of interest and (2) proximity of the remote connected vehicles in the first segment to the object of interest; and
repeating the assignment step for each segment within the plurality of segments, wherein the assignment step is configured so higher priority scores are assigned to individual segments if the remote connected vehicles present in the individual segments have forward-facing sensors that are capable of measuring the object of interest and the remote connected vehicles present in the individual segments are closer to the object of interest.

14. The system of claim 13, further comprising a vehicle control system and wherein the non-transitory memory stores additional computer code that is operable, when executed by the processor, to cause the processor to execute additional steps including:
receiving a set of wireless messages from the set of remote connected vehicles;
assigning classification data to each remote connected vehicle included in the set of remote connected vehicles by executing a classification process that includes determining which particular remote connected vehicle transmitted each wireless message, determining which segments of the plurality of segments are within sensory range of the forward-facing sensors of the particular remote connected vehicle, and outputting the classification data to assign to the each remote connected vehicle based on which of the individual segments within the plurality of segments are within the sensory range of the each remote connected vehicle and their corresponding priority scores;
ranking the set of wireless messages in a queue based on the classification data assigned to each transmitter of each of the set of wireless messages; and
processing, by the vehicle control system, the set of wireless messages based on the ranking of the queue so that higher ranked wireless messages are processed before lower ranked wireless messages.

15. The system of claim 13, wherein the remote connected vehicles in each segment are within a same range of proximity relative to the object of interest.

16. The system of claim 14, wherein the vehicle control system processes the wireless messages by verifying their accuracy and using sensor data included in a payload of the wireless messages to control a functionality of the ego vehicle based at least in part on the sensor data satisfying a threshold for accuracy.

17. A computer program product of an ego vehicle including computer code stored on a non-transitory memory that is operable, when executed by an onboard vehicle computer of the ego vehicle, to cause the onboard vehicle computer to execute operations including:
determine a location of an object of interest in a roadway environment that includes the ego vehicle and a set of remote connected vehicles, wherein the remote connected vehicles included in the set are equipped with forward-facing sensors;
segment the roadway environment into a plurality of segments; and
assign a priority score to a first segment within the plurality of segments based on (1) whether the forward-facing sensors of the remote connected vehicles present in the first segment are capable of measuring the object of interest and (2) proximity of the remote connected vehicles in the first segment to the object of interest; and
repeat the assignment operation for each segment within the plurality of segments, wherein the assignment step is configured so higher priority scores are assigned to individual segments if the remote connected vehicles present in the individual segments have forward-facing sensors that are capable of measuring the object of interest and the remote connected vehicles present in the individual segments are closer to the object of interest.

18. The computer program product of claim 17, wherein the non-transitory memory stores additional computer code that is operable, when executed by the onboard vehicle computer, to cause the onboard vehicle computer to execute additional operations including:
receive a set of wireless messages from the set of remote connected vehicles;
assign classification data to each remote connected vehicle included in the set of remote connected vehicles by executing a classification process that includes determining which particular remote connected vehicle transmitted each wireless message, determining which segments of the plurality of segments are within sensory range of the forward-facing sensors of the particular remote connected vehicle, and outputting the classification data to assign to the each remote connected vehicle based on which of the individual segments within the plurality of segments are within the sensory range of the each remote connected vehicle and their corresponding priority scores;
rank the set of wireless messages in a queue based on the classification data assigned to each transmitter of each of the set of wireless messages; and
process the set of wireless messages based on the ranking of the queue so that higher ranked wireless messages are processed before lower ranked wireless messages.

19. The computer program product of claim 17, wherein the remote connected vehicles in each segment are within a same range of proximity relative to the object of interest.

20. The computer program product of claim 17, wherein the remote connected vehicles in each segment share a similar ability to measure the object of interest using their forward-facing sensors.

* * * * *